United States Patent [19]

Storm

[11] Patent Number: 4,545,729
[45] Date of Patent: Oct. 8, 1985

[54] WIND TURBINE APPARATUS

[76] Inventor: Joe Storm, 1105 W. Elna Rae, Tempe, Ariz. 85281

[21] Appl. No.: 518,047

[22] Filed: Jul. 28, 1983

[51] Int. Cl.[4] .............................................. F03D 7/06
[52] U.S. Cl. ............................ 416/132 B; 416/119; 416/142
[58] Field of Search ............... 416/132 B, 119, 135 A, 416/88, 240 A, DIG. 5, 142 B

[56] References Cited

U.S. PATENT DOCUMENTS

| | | | |
|---|---|---|---|
| 155,472 | 9/1874 | Smythe | 416/132 |
| 215,035 | 5/1879 | Alden | 416/41 |
| 227,842 | 5/1880 | Rudolph | 416/132 |
| 243,169 | 6/1881 | Sprague | 416/132 |
| 556,396 | 3/1896 | Auld | 416/119 |
| 1,804,493 | 5/1931 | Benjamins | 416/132 |
| 2,015,777 | 10/1935 | Belding | 416/132 |
| 2,677,344 | 5/1954 | Annis | 416/240 A X |
| 3,995,170 | 11/1976 | Graybill | 60/398 |
| 4,052,134 | 10/1977 | Rumsey | 416/119 |
| 4,191,507 | 3/1980 | DeBerg | 416/132 |
| 4,274,011 | 6/1981 | Garfinkle | 416/132 B X |
| 4,276,033 | 6/1981 | Krovina | 416/240 A X |
| 4,341,176 | 7/1982 | Orrison | 416/119 X |
| 4,342,539 | 8/1982 | Potter | 416/142 B X |
| 4,350,895 | 9/1982 | Cook | 416/240 A X |
| 4,353,702 | 10/1982 | Nagy | 416/240 A X |
| 4,417,853 | 11/1983 | Cook | 416/132 B |
| 4,420,692 | 12/1983 | Kos | 416/41 A X |
| 4,435,125 | 3/1984 | Cook | 416/132 B |
| 4,457,669 | 7/1984 | Corry | 416/132 B |

FOREIGN PATENT DOCUMENTS

| | | | |
|---|---|---|---|
| 2642570 | 3/1978 | Fed. Rep. of Germany | 416/240 A |
| 555175 | 6/1923 | France | 416/119 |
| 2289769 | 5/1976 | France | 416/DIG. 5 |
| 2468002 | 4/1981 | France | 416/119 |
| 577300 | 10/1977 | U.S.S.R. | 416/240 A |

*Primary Examiner*—Everette A. Powell, Jr.
*Attorney, Agent, or Firm*—H. Gordon Shields

[57] ABSTRACT

Wind turbine apparatus includes a plurality of sail elements secured to a circular frame rotatable in response to wind reacting with the sail elements and a control system for the sail elements includes a weight having cables extending from the weight to the sail elements. Movement of the weight in response to wind velocity results in a change in the sail elements exposed to the wind.

29 Claims, 19 Drawing Figures

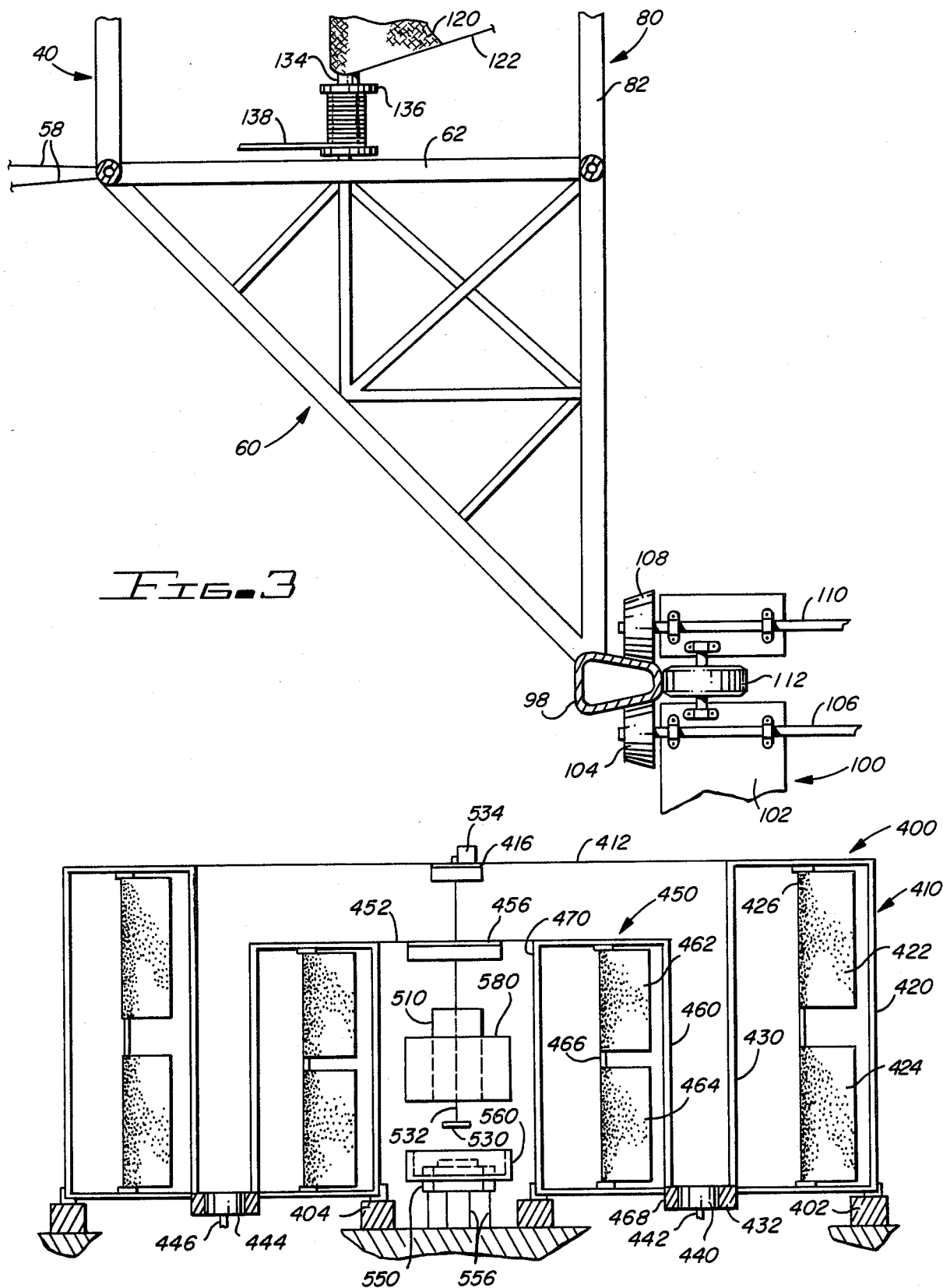

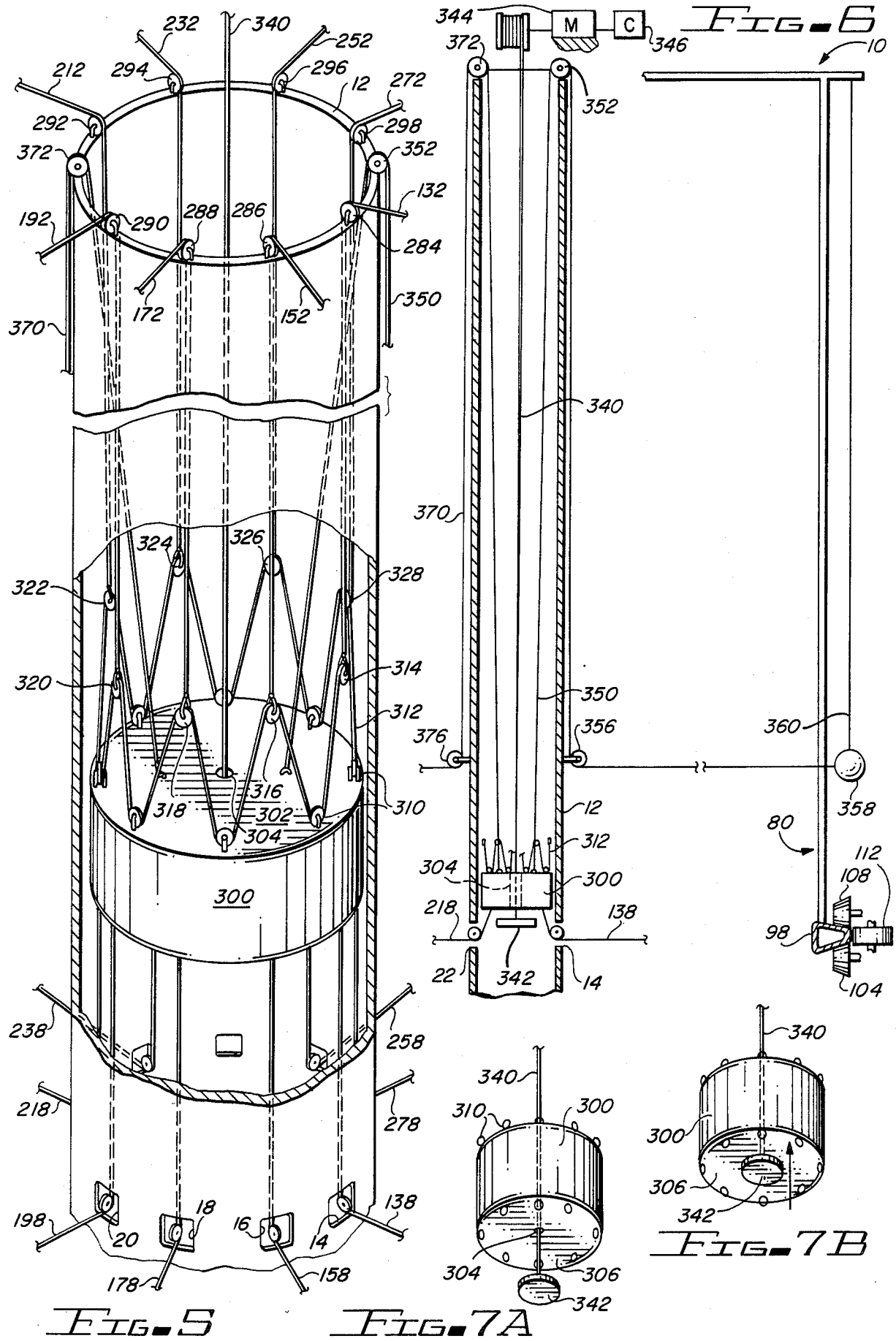

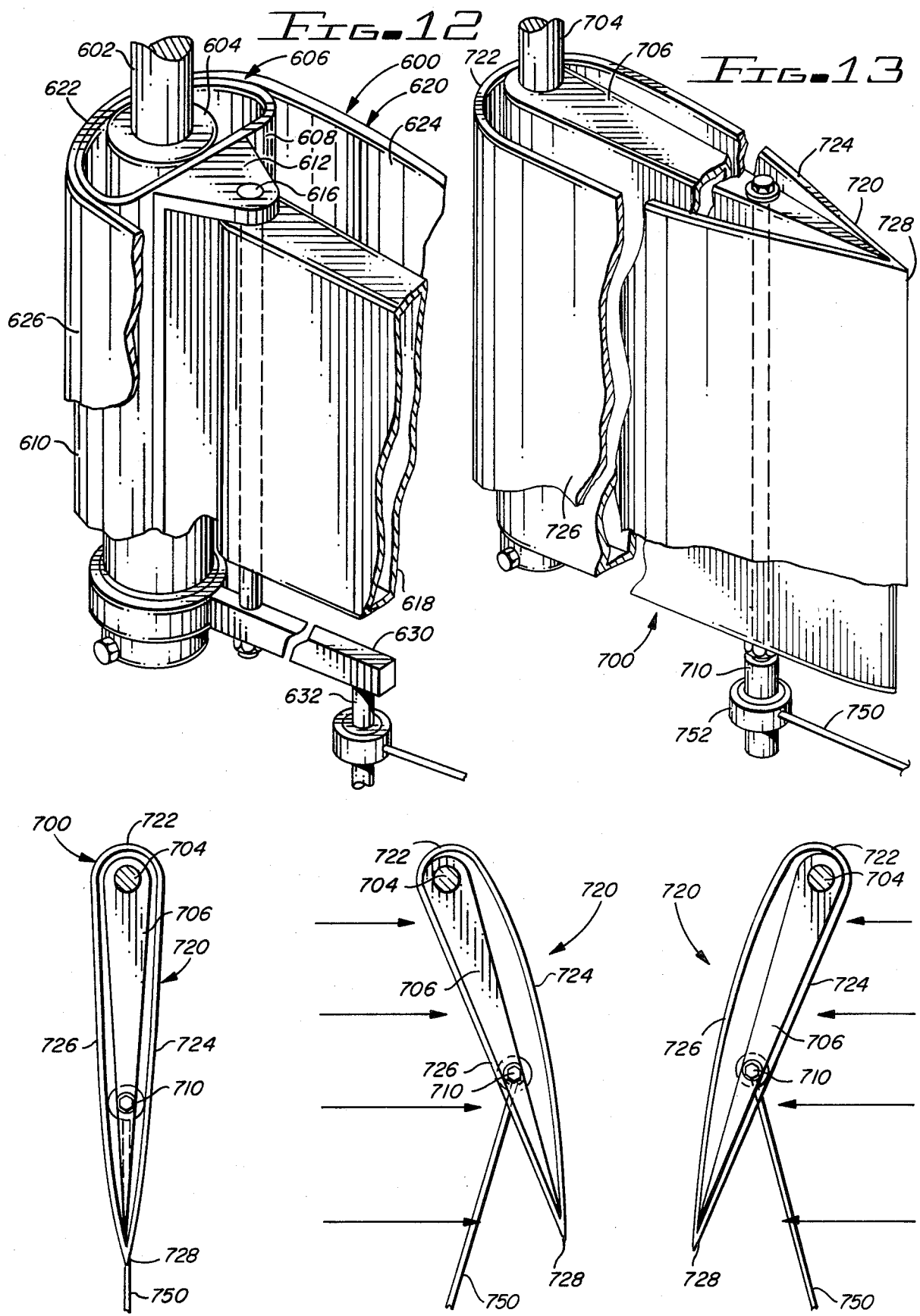

WIND TURBINE APPARATUS

BACKGROUND OF THE INVENTION

1. Field of the Invention

This invention relates to wind turbine apparatus and, more particularly, to wind turbine apparatus having a vertical axis of rotation and sail elements for harnassing the energy of the wind.

2. Description of the Prior Art

U.S. Pat. No. 155,472 discloses a wind turbine having a horizontal axis of rotation and a control system which employs a movable weight. The movement of the weight causes the pitch of the sails to vary such that the speed of rotation is diminished as the force of the wind increases. This provides a regulatory system or control system for holding the speed of rotation relatively constant even though the velocity of the wind varies substantially.

U.S. Pat. No. 215,035 discloses another type of wind turbine having a vertical axis of rotation and vanes or sails that are expanded or contracted in accordance with the wind speed through a control system which includes a coil spring. The sails or buckets are secured to fixed or rigid top and bottom elements which move towards and away from each other in response to wind speed and the force of the coil spring. The greater the wind velocity, the closer the top and bottom elements of the sails or buckets are together, thus diminishing the area of the sails available to the wind. Conversely, as the wind velocity diminishes, a greater area of the sails is available to the wind by the movement of the structural elements.

U.S. Pat. No. 227,842 discloses a weight system connected to vanes that control the pitch of the vanes in response to the speed of the wind. The apparatus includes a vertical axis of rotation, with the weights moving vertically in response to the speed of rotation of the apparatus.

U.S. Pat. No. 243,169 discloses a horizontally rotating element having flexible sails. The sails are triangular in configuration, with one edge of the sails relatively fixed and a corner of the sails secured to a weight system which allows the sails to spill wind when the rotation speed increases due to increased wind velocity and, when the wind velocity decreases, allows the weight to move to increase the area of the sails available to catch the wind.

U.S. Pat. No. 1,804,493 discloses another vertical axis of rotation wind turbine which includes tension springs and weights. The combination of the springs and weights causes the sails to furl as the wind speed increases. As the wind speed decreases, the tension spring and the weights cause the sails to unfurl, thus allowing greater sail area to be available to the wind.

U.S. Pat. No. 2,015,777 discloses a horizontal axis of rotation using triangular shaped sails and tension springs. As wind speed increases, the tension springs stretch and the vanes flatten out so as to decrease the area of the sails or vanes available to the wind. As the wind speed decreases, the sails or vanes are pulled by the tension springs to provide a greater frontal area available to the wind.

U.S. Pat. No. 4,191,507 discloses another type of wind turbine having a vertical axis of rotation and a plurality of sails. The sails have a fixed edge and a flexible edge. When the fixed edge is the trailing edge, the sails are available to the wind, but when the fixed edge is the leading edge to the wind, the sails flatten out to decrease the drag. The apparatus is designed for minimizing drag in a lightweight windmill.

All of the above noted patents are of the drag type. Some of the above noted patents have horizontal axes of rotation and some have vertical axes of rotation. In general, vertical axis rotors have a major advantage over horizontal axis rotors in that they do not have to be turned into the wind as the direction of the wind changes. This simplifies the design requirements of the system and at the same time decreases or eliminates certain forces which may cause more stress on blades, bearings, and other elements or components of horizontal axis systems.

Vertical axis drag devices of the prior art generally have relatively high starting torques, but they also usually have relatively low tip-to-wind speeds and relatively low power outputs per given rotor size and weight.

With rotors utilizing aerodynamic configurations to provide lift force, relatively high tip-to-wind speeds and accordingly relatively high power outputs per given rotor size, etc., are provided. However, the control systems for varying the rotational speed of the rotors includes the control of the pitch of the particular blade or air foil. For drag devices, the control systems generally include apparatus for controlling the size of the drag device, usually a sail, that is available to the wind. In general, as the wind speed increases, the size of the sail decreases, and vice-versa, to provide a relatively constant rotational speed. The above-discussed patents disclose several different types of control systems.

As is well known and understood, the greater the diameter of the rotor, the slower the revolutions per minute may be to provide a relatively high tip speed. In the apparatus of the present invention, the diameter of the rotor may be virtually any size, depending on the land available, the terrain, and other factors.

SUMMARY OF THE INVENTION

The wind turbine apparatus described and claimed herein comprises a vertical axis of rotation wind turbine utilizing sail elements, including flexible sails which may be furled and unfurled in response to the speed of the wind, and which utilize a weight system for varying the area of the sail elements exposed to the wind, such as for furling and unfurling flexible sail elements through a sail roller connected by a cable system to the bottom of a weight for furling the sail elements and a cable system connected to the weight and to the outer or free ends of the sail elements for unfurling the sail elements.

Among the objects of the present invention are the following:

To provide new and useful wind turbine apparatus;

To provide new and useful control system for wind turbine apparatus;

To provide new and useful vertical axis wind turbine apparatus;

To provide a new and useful system for furling and unfurling flexible sail elements of a wind turbine;

To provide new and useful apparatus for varying the area of a flexible sail element in response to wind velocity in a wind turbine apparatus;

To provide new and useful wind turbine apparatus having air foil sail elements;

To provide new and useful apparatus for utilizing the energy of wind; and

To provide new and useful apparatus which can be made in a wide range of sizes for utilizing wind energy.

BRIEF DESCRIPTION OF THE DRAWING

FIG. 3 is a view of a portion of the apparatus of FIG. 2 taken generally along line 3—3 of FIG. 2.

FIG. 5 is a view in partial section of a portion of the apparatus of the present invention.

FIG. 6 is an enlarged view, in partial section, of another portion of the apparatus of FIG. 1.

FIG. 7A and FIG. 7B are enlarged bottom perspective views of a portion of the apparatus of the present invention, illustrating the sequential actuation of part of the apparatus.

FIG. 8 is a schematic representation of an alternate embodiment of the apparatus of the present invention.

FIG. 12 is a perspective view, partially broken away, of a portion of the apparatus of FIG. 11.

FIG. 13 is a perspective view of another alternate embodiment of a portion of the apparatus of the present invention.

FIGS. 14A, 14B, and 14C are top views sequentially illustrating the operation of the apparatus of FIG. 13.

DESCRIPTION OF THE PREFERRED EMBODIMENT

Figure 1:
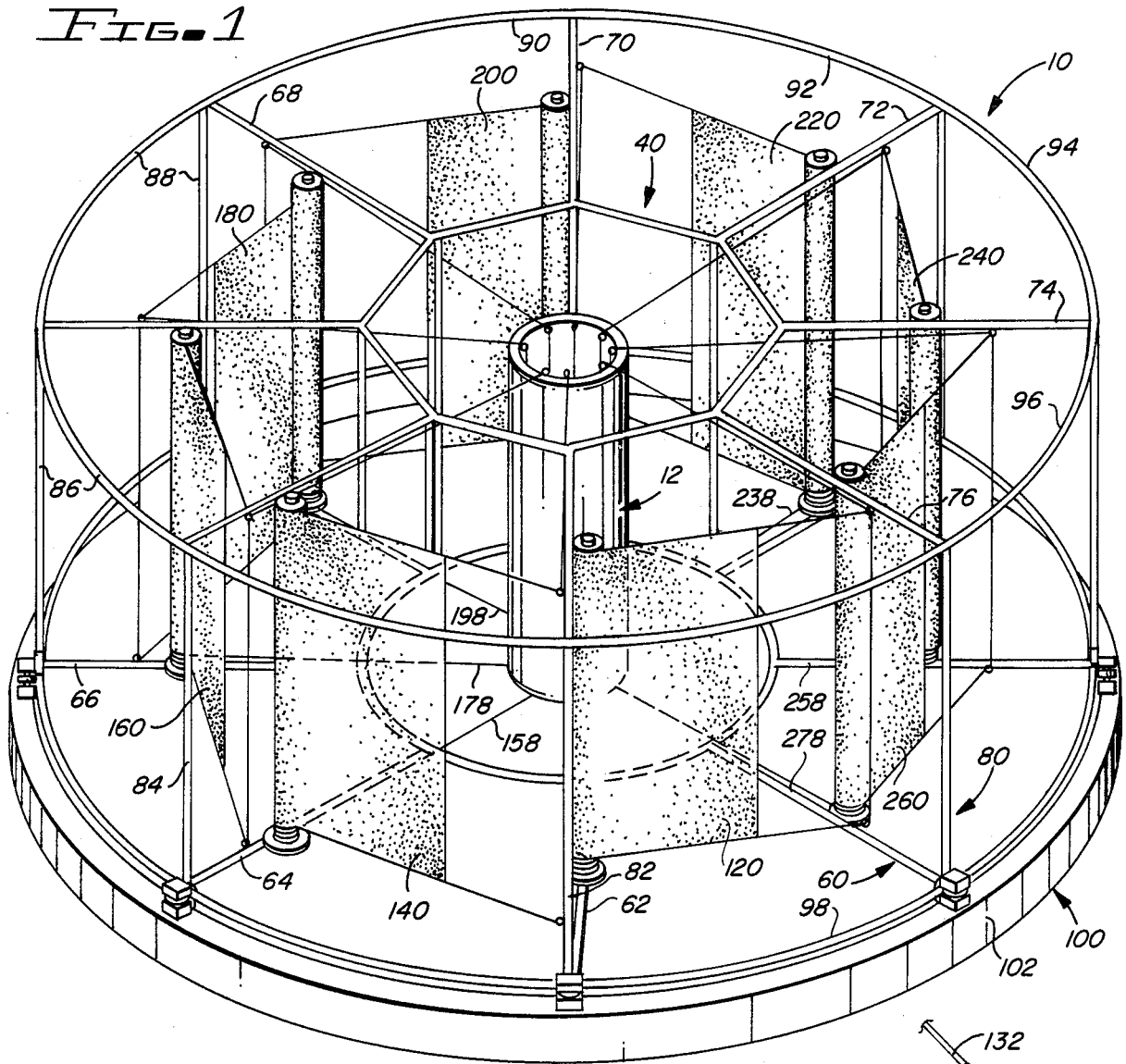
FIG. 1 is a perspective view of the apparatus of the present invention.
Figure 4:
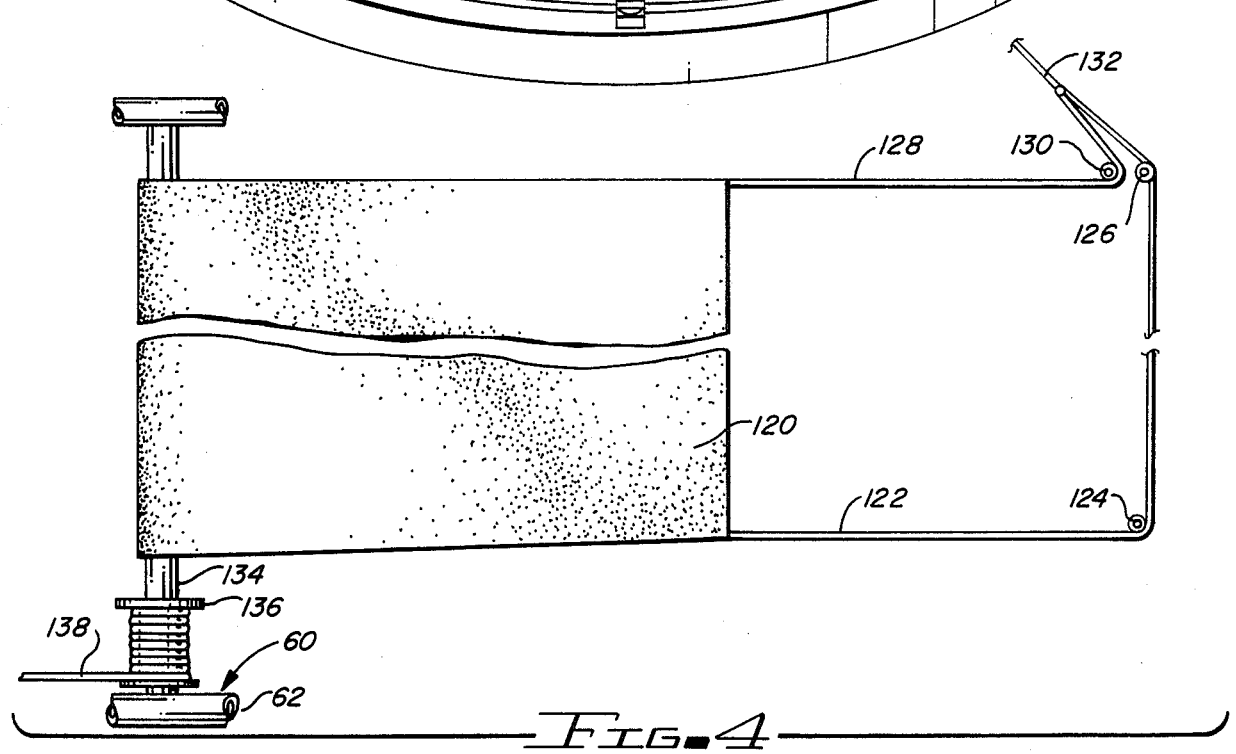
FIG. 4 is a view of another portion of the apparatus of FIG. 2, taken generally along line 4—4 of FIG. 2.
Figure 2:
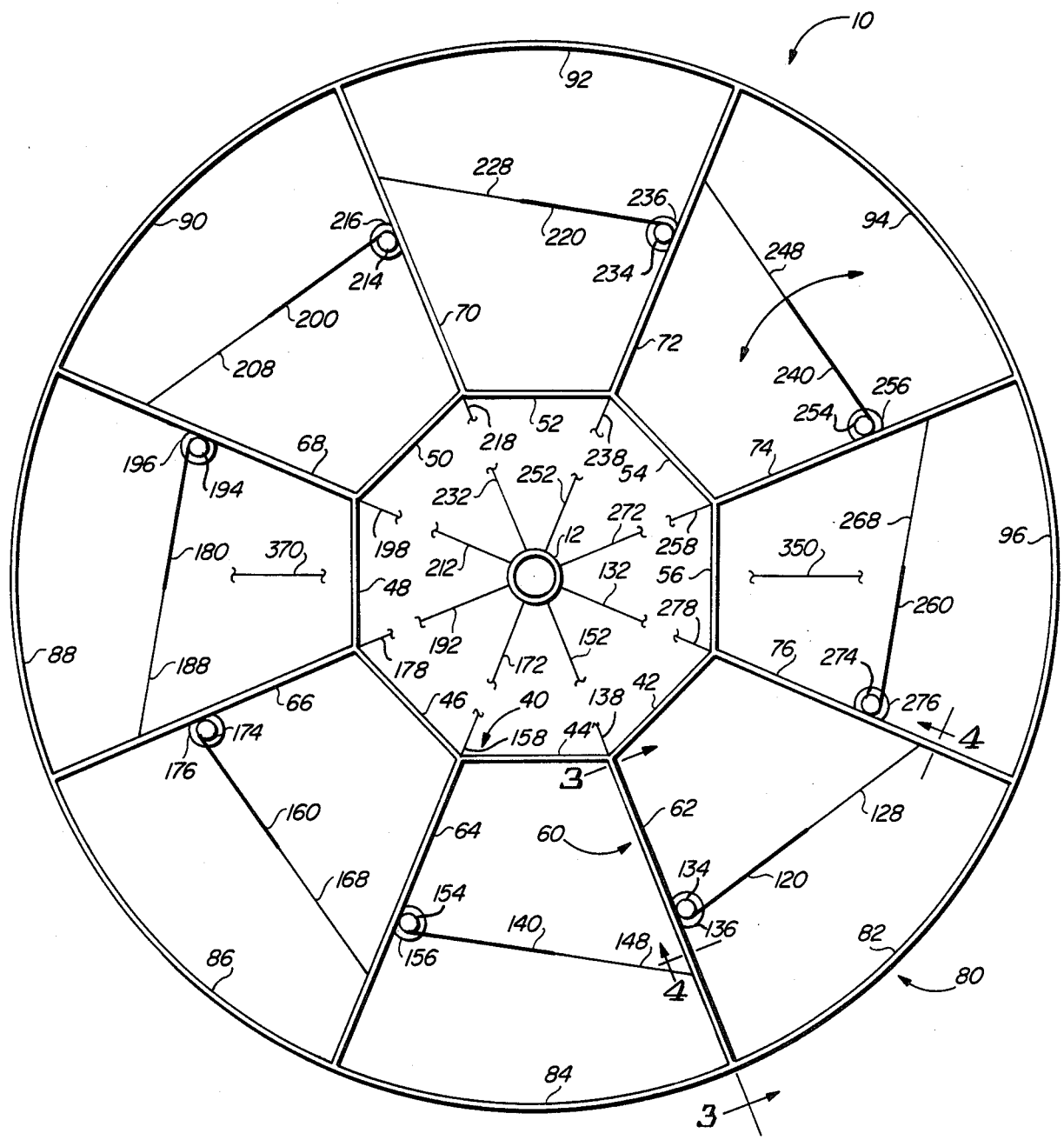
FIG. 2 is a top schematic representation of the apparatus of FIG. 1.

FIG. 1 is a perspective view of wind turbine apparatus 10 of the present invention. FIG. 2 is a top view of the wind turbine apparatus 10 of FIG. 1. The wind turbine apparatus 10 is schematically represented as having eight sails secured to a frame. The control of the sails, as far as furling and unfurling the sails is concerned, is accomplished through a cable system, discussed below, which extends to a center pole or column 12. FIG. 3 is a view in partial section of the wind turbine apparatus 10 of FIGS. 1 and 2, taken generally on line 3—3 of FIG. 2. FIG. 4 is a side view of a sail and illustrating some of the elements associated therewith, taken generally along line 4—4 of FIG. 2. For the following discussion, reference will primarily be made to FIGS. 1, 2, 3, and 4.

The wind turbine apparatus 10 includes, generally, two concentric frames, including an inner frame 40 and an outer frame 80. A connecting frame 60 extends between the inner and outer frames. The eight sails and their various elements are secured to the frames. As best shown in FIG. 2, the inner frame is of a general octagonal configuration, while a portion of the outer frame may similarly be octagonal, but the outer frame 80 also includes a circular outer peripheral power rail 98. This is best illustrated in FIG. 3. While both inner and outer frames could be entirely circular in their configuration, the advantage of utilizing octagonal configurations for the basic frame structure lies in the less expensive cost of manufacturing the frames. The reason for the circular outer rail 98 will be discussed below.

Of the inner frame, eight portions are illustrated in FIG. 2. The eight segmental portions include a portion 42, a portion 44, a portion 46, a portion 48, a portion 50, a portion 52, a portion 54, and a portion 56. The portions, together, define an inner octagonal frame.

The outer frame also includes eight segments or portions, which are generally parallel to the inner frame portions. The outer frame portions include an outer frame portion 82, a portion 84, a portion 86, a portion 88, a portion 90, a portion 92, a portion 94, and a portion 96. The outer frame portions 82 . . . 96 also define an octagonal outer frame, substantially parallel to, and concentric with, the inner frame 40. However, it will be understood that the configuration of the outer frame is such as to enable the sail elements, discussed below, to move in response to wind forces with adequate clearance so as to prevent interference between the frame and the sail elements as they move.

The connecting frame 60 is likewise divided into eight portions, namely a portion 62, a portion 64, a portion 66, a portion 68, a portion 70, a portion 72, a portion 74, and a portion 76. The portions 62 . . . 76 extend generally radially between the inner frame 40 and the outer frame 80, and the respective portions thereof.

As best shown in FIG. 3, and also as shown in FIG. 2, the outer peripheral power rail 98 is secured to the bottom of the outer frame and the connecting frame. While the various frame members, as discussed above, are comprised of generally straight structural elements, the outer peripheral power rail 98 is circular. The cross-section of the power rail 98 is, however, somewhat wedge-shaped or of a slightly beveled configuration, with the outer periphery of the rail having a lesser height or thickness than the inner part of the rail.

The power rail tapers outwardly from its inner periphery so as to mate with appropriately beveled wheels in a manner similar to the mating of gears. The extent of the taper varies with the radius of the apparatus 10, and specifically of the outer frame 80.

In order to have the maximum area of the power rail 98 bear on a pair of power wheels, namely a lower power wheel 104 and an upper power wheel 108, and a plurality of additional power wheels (not shown) that are spaced apart about the periphery of the apparatus 10, the power rail 98 has the tapered or beveled configuration illustrated in FIG. 3. The power wheels have a mating or corresponding taper, and are thus frusto-conical in configuration.

The power wheels 104 and 108 are journaled for rotation in appropriate bearings and supported by a support structure 100. The support structure 100 includes a base 102. The base 102 may be a generally solid base extending about the periphery of the wind turbine apparatus 10, or it may include a plurality of spaced apart pylons, etc. The configuration of the support structure 100 accordingly depends on the overall size and weight of the turbine apparatus 10.

The lower power wheel 104 includes an axle or power takeoff shaft 106, and the upper power wheel 108 includes a power takeoff shaft or axle 110. The shafts 106 and 110 extend to appropriate or desired apparatus, such as generators, etc.

A guide or thrust wheel 112, which is appropriately journaled for rotation in the vertical plane, or substantially perpendicularly to the power takeoff wheels 104 and 108, is also secured to the base 102 of the support structure 100. The outer periphery of the power rail 98 bears against the guide or thrust wheel 112.

The two power wheels 104 and 108 and the guide or thrust wheel 112, as illustrated in FIG. 3, are typical of a plurality of such wheel assemblies spaced apart about the periphery of the outer frame 80 of the wind turbine apparatus 10. The number of such assemblies depends generally on the size of the turbine apparatus 10. Moreover, it will be understood that not all of the power wheels need to include power takeoff shafts. Some of them may actually be idler wheels used for support purposes rather than for the combined purposes of support and power takeoff.

Extending between adjacent portions of the connecting frame 60, and disposed between the inner frame 40 and the outer frame 80, are a plurality of sail elements. The sail elements, eight in number, include a sail 120, disposed between the inner frame portion 42 and the outer frame portion 82, and the connecting frame portions 62 and 76, a sail 140 disposed between the inner frame portion 44 and the outer frame portion 84 and the connecting frame portions 64 and 62, a sail 160 disposed between the inner frame portion 46, the outer frame portion 86, and the connecting frame portions 66 and 64. Also, a sail 180 is shown extending between the inner frame portion 48 and the outer frame portion 88 and the connecting frame portions 68 and 66, a sail 200 is shown disposed between the inner frame portion 50 and the outer frame portion 90 and between the connecting frame portions 70 and 68, and a sail 220 is shown disposed between the inner frame portion 52 and the outer frame portion 92, and the connecting frame portions 70 and 72. In addition, there is a sail 240 shown disposed between the inner frame portion 54 and the outer frame portion 94 and between the connecting frame portions 72 and 74, and finally a sail 260 is shown disposed between the inner frame portion 56 and the outer frame portion 96, and between the connecting frame portions 74 and 76.

One side of each sail is fixed to a sail roller, and the opposite side of each sail, remote from the sail roller, is secured to cables which extend to an evener cable which is secured to a weight within the central column or shaft 12. The bottom of the weight within the center column or cylinder 12 is connected, again by a cable connection, to a reel at the bottom of each sail roller.

The sail 120 is connected to a sail roller 134. At the bottom of the sail roller 134 is a reel 136. The sail 140 is secured to a sail roller 154. At the bottom of the sail roller 154 is a reel 156.

The sail 160 is secured to the sail roller 174, and a reel 176 is secured to the bottom of the sail roller 174. The sail 180 is secured to a sail roller 194, and a reel 196 is disposed on the bottom of the sail roller 194. The sail 200 is secured to a sail roller 214, and a reel 216 is secured to the bottom of the sail roller 214.

The sail 220 is secured to a sail roller 234, and a reel 236 is disposed at the bottom of the sail roller 234. The sail 240 is secured to a sail roller 254, and a reel 256 is secured to the bottom of the sail roller 254. Finally, the sail 260 is secured to a sail roller 274, and a reel 276 is disposed at the bottom of the sail roller 274.

FIG. 4 is a front view of the sail 120, shown secured to the sail roller 134. Some of the details of the sail 120, its roller 134, and reel 136, are also shown in FIG. 3. For the following discussion of the sail member 120, and its associated elements, reference will primarily be made to FIG. 4. Reference may also be made to FIGS. 2 and 3 for additional details.

The sail roller 134, with the reel 136 secured thereto, is appropriately journaled for rotation on the connecting frame portion 62 of the connecting frame 60. The diameter of the reel 136 is greater than that of the sail roller 134. A cable 138 is wound about the reel 136 and extends to the center shaft or column 12. This will be discussed in detail below, primarily in conjunction with FIG. 5.

The outer or trailing or free end of the sail 120, as opposed to the inner or fixed end of the sail 120 which is secured to the roller 134, is secured to a pair of cables or lines 122 and 128. The term "free" will generally be used hereinafter to denote the outer end of the sails remote from the sail rollers. The lower cable or line 122 extends from the outer bottom corner of the sail 120 over a pulley 124 and upwardly to an upper pulley 126. The upper trailing corner of the sail 120 is secured to one end of an upper cable or line 128. The cable 128 extends outwardly, generally parallel to the cable 122, to a pulley 130. The pulley 130 is disposed adjacent to the pulley 126.

From the pulley 130, the upper cable 128 extends adjacent to the upper end of the lower cable 122 to a common juncture where both the cables 122 and 128 join to a single inner top cable or line 132. The inner top cable 132 then extends to the center shaft or column 12 where it is secured to a weight 300, as will be discussed below. The upper cable 128 is schematically represented in FIG. 2, and the outer cable 132 is also schematically represented in FIG. 2. The pulleys 124, 126, and 130 are appropriately secured to the connecting frame portion 76. The securing connections of the pulleys to the frame portion 76 is not illustrated. However, FIG. 2, which is a schematic representation, shows the upper cable 128 extending from the outer or free end of the sail 120 to the connecting frame portion 76.

The sail 120, with its roller 134, the reel 136, and the cables 122, 128, 132, and 138, with the several pulleys, are typical of all eight of the cable, reel, and pulley assemblies associated with the sails illustrated best in FIG. 4. The lower or bottom control cables are not shown in FIG. 2, but the upper control cables are schematically represented, along with the inner top control cables which extend from the juncture of the upper and lower control cables inwardly towards the center of the apparatus. This will be discussed in more detail below.

In FIG. 2, an upper control cable 148 is shown extending from the free end of the sail 140 to the connecting frame portion 62. The cable 148, and a parallel bottom cable, not shown, are ultimately connected to an inner top control cable 152. The inner top control cable 152 is schematically illustrated in FIG. 2, adjacent to, and extending radially inwardly to/outwardly from, the center shaft or column 12, or between the shaft 12 and the sail element 140.

An upper control cable 168 is shown secured to the free end of the sail 160. The cable 168 extends from the sail 160 to the connecting frame portion 64. The cable 168, and a lower control cable, not shown, both extend to an inner top control cable 172. The control cable 172 is shown extending radially outwardly from, or inwardly towards, the center column or shaft 12.

An upper control cable 188 is shown extending outwardly from the sail 180 to the connecting frame portion 66. An inner top control cable 192 is shown extending radially outwardly from the center column or shaft 12 toward the connecting frame portions 66. The cable 192 is connected to the cable 188 and to a parallel, lower control cable, not shown.

An upper control cable 208 is shown extending outwardly from the free end of the sail 200 toward the connecting frame portion 68. A mating inner top control cable 212 is shown extending outwardly from the center shaft 12 toward the connecting frame portion 68 where it is secured to the upper control cable 208 and to its lower, parallel control cable, not shown.

An upper control cable 228 is shown extending outwardly from the sail 220 to the connecting frame portion 70. The cable 228, and a parallel, lower control cable, not shown, are secured to the connecting frame portion 70 and to an inner top control cable 232 which extends to the center shaft 12.

An upper control cable 248 is shown extending outwardly from the free end of the sail 240 towards the connecting frame portion 72. The upper control cable 248 and a lower control cable, not shown, disposed generally parallel to the cable 248, are both secured to an inner top control cable 252. The control cable 252 extends to the center column 12.

Finally, an upper control cable 268 is shown extending from the free end of the sail 260 to the connecting frame portion 74 where it, and a lower, parallel control cable, not shown, are both secured. The upper and lower control cable are connected to an inner top control cable 272. The inner top control cables 132 . . . 272 are all shown radially extending outwardly from, or inwardly towards, the column or shaft 12 in FIG. 2. They are also shown in greater detail in FIG. 5.

It will be noted that the sails 120 . . . 260 are extending generally perpendicular to a radius from the center of rotation of the apparatus 10 to the midpoint of each sail. As shown in FIG. 2, the sails 120 . . . 260 are shown in a static, no-wind situation, where the sails are in such an orientation as to have the plane of the sails perpendicular, at the midpoint of the sails, to such a radius.

From FIG. 4, it will be noted that the sails may not be rectangular in configuration. Rather, they may taper slightly so that the length of the outer, free edge of a sail may be shorter in length than the fixed end of the sail as secured to a sail roller. The purpose for this is to prevent the sails from rubbing on or against the various frame elements. As shown in FIG. 4, the bottom edge of the sail 120 tapers upwardly and outwardly from the sail roller 134 to the outer free edge of the sail where the lower control line or cable 122 is connected.

FIG. 5 is an enlarged view in partial section of a portion of the center or central shaft or column 12, illustrating the various elements associated therewith. FIG. 6 is a view in partial section of the central column or shaft 12, and a portion of the outer frame 80, illustrating various elements associated therewith. FIGS. 7A and 7B are perspective views of a portion of the apparatus illustrated in FIGS. 5 and 6. For the following discussion, reference will primarily be made to FIGS. 5, 6, 7A, and 7B. Reference will also be made to FIGS. 2, 3, and 4.

A portion of the central column 12 is shown in FIGS. 5 and 6. The lower portion of the central shaft or column 12 is appropriately journaled for rotation at its bottom end. Such required structure, including the bearings, etc., are well known and understood in the art and accordingly are not illustrated herein.

Within the center or central shaft or column 12 is a weight 300. The weight 300 includes a top surface 302 (see FIG. 5) and a bottom surface 306 (see FIGS. 7A and 7B). A bore 304 extends concentrically through the weight 300.

On the top surface 302 of the weight 300 and disposed adjacent to the outer periphery of the weight 300, which is of a general cylindrical configuration, are eight pulleys 310. The pulleys 310 are equally spaced apart on the top surface 302 of the weight 300. Extending through the pulleys 310 is a tension equalizer cable 312. A plurality of pulleys, secured to the ends of the various inner control cables 132 . . . 272, are movable on the cable 312. The control cable 132 is shown extending over a pulley 284 secured to the top or upper portion of the column 12. The cable 132 then extends downwardly to a pulley 314 on the cable 312. The cable 152 is shown extending over a pulley 286 secured to the top of the column 12. The cable 152 extends downwardly from the pulley 286 to a pulley 316 on the cable 312.

The control cable 172 extends over a pulley 288 and downwardly to a pulley 318. The pulley 288 is secured to the upper portion of the column 12 and the pulley 318 is disposed on the cable 312. The cable 192 extends over a pulley 290 and downwardly to a pulley 320. The pulley 320 is on the cable 312, while the pulley 290 is secured to the top or upper portion of the column 12.

The line or cable 212 extends over a fixed pulley 292 at the top of the column 12 and downwardly to a movable pulley 322 on the cable 312. The control cable 232 extends over a fixed pulley 294 and downwardly to a movable pulley 324. The inner control cable 252 extends over a fixed pulley 296 and downwardly to a movable pulley 326. The control cable 272 extends over a fixed pulley 298 and downwardly to a movable pulley 328. The movable pulleys 324, 326, and 328 are all movable on the cable 312, as are the pulleys 314, 316, 318, 320, and 322. The fixed pulleys 294, 296, and 298 are all secured to the top of the center column 12, as are the fixed pulleys 284, 286, 288, 290, and 292. The fixed pulleys 284 . . . 298 are appropriately spaced apart in the same fixed relationship as are the inner control cables 132 . . . 272. See FIG. 2.

The various control cables 132 . . . 272 are connected to pulleys that are in turn disposed on the cable 312. The cable 312 is an evener cable which in turn is connected to the weight 300 by a plurality of pulleys 310. As indicated, the pulleys 310 are spaced apart adjacent to the outer periphery of the top of the weight 300.

The purpose of the evener cable 312 is to provide even tension for all sails or air foils at all times of operation. This prevents sudden jolts as the sails or the air foils move from side to side as the result of the change of the wind angle on them because of a change in the direction of the wind and/or a change due to the rotation of the turbine.

The evener cable enables one or more of the sails or air foils to move sideways individually with minimum effect on the other sails or air foils. For example, a sail may take a big gust of wind and may move sideways and spill the wind without causing all of the sails to roll up or furl. This is necessary because of sudden wind shear which may occur in localized small areas.

In the hypothetical turbine, shown with eight sails, when one sail moves sideways, the evener cable enables that sail to move the weight only one-eighth as far as it would have to move it if there were no evener cable involved. From this, it is easy to visualize the small movement of the weight necessary for one sail to move sideways when a large number of sails are involved.

A cable 350 is shown secured to the top 302 of the weight 300 inwardly from the outer periphery, but spaced apart from the bore 304. Another cable 370 is also secured to the top 302 of the weight 300 inwardly from the outer periphery and spaced apart from the bore 304. The cables 350 and 370 are on a diameter of the weight 300, and are equally spaced apart from the center of rotation of the weight 300 on the diameter. The cable 350 extends upwardly from the top 302 of the weight 300 to a pulley 352. The pulley 352 is schematically illustrated in FIG. 5 and in FIG. 6 secured to the top of the column 12. The cable 350 extends from the pulley 352 downwardly along the outside of the column 12 to another pulley 356 (see FIG. 6). The cable 350 then extends outwardly from the pulley and past the outer frame 80 to a flyball weight 358. The flyball weight 358 is in turn secured by a cable 360 to the upper portion of the outer frame 80.

The cable 370 extends upwardly from the weight 300 to a pulley 372. The cable 370 then extends downwardly, substantially parallel to the cable 350, to a pulley 376. The pulleys 372 and 376 are aligned with, and correspond to, the pulleys 352 and 356, respectively. From the pulley 376, the cable 370 extends outwardly to another flyball, not shown, but substantially aligned with the flyball 358 and suspended in substantially the same manner to the outer frame 80. The purpose of the flyball weights will be discussed in detail below.

A cable 340 extends downwardly through the bore 304 in the center of the weight 300. Attached to the bottom of the cable 340 is a plate 342. Remote from the plate 342, the cable 340 is secured to a winch which in turn rotates with the shaft of a motor 344. The motor 344 is actuated to cause the plate 342 to move upwardly, as will be discussed in conjunction with FIGS. 7A and 7B below.

As may best be understood from FIGS. 4, 5, and 6, wind blowing against the sails 120 . . . 260 of the wind turbine apparatus 10 will cause a billowing of the sails. The sails in turn will impart a rotation to the turbine apparatus 10 in response to the force of the wind against the sails. The billowing and movement of the sails depends on the wind velocity and on the particular orientation of the sails at any given moment with respect to the relative wind and with respect to the rotation of the turbine apparatus 10.

When the winch line 340 is lowered to move the plate 342 from below the weight 300, the weight is allowed to move freely in response to cables connected to the sails. The sails will then be completely unfurled. This is the condition shown in FIGS. 1, 2, and 4.

When the wind blows, the free ends of the sails, which are the trailing edges, move away from the wind and the sails billow. The billowing of each sail causes the sail to form an airfoil and to bring the top and bottom edges of the sails, particularly at the trailing or free edge, to form a type of chute. The wind then flows towards the center of the sail and in the chute, resulting in a jet effect at the trailing edge of each sail. The lift effect of the air foil, the jet effect of the chute, and the sail effect, all combined, result in tension being applied to the various control cables. For example, as tension is applied by the billowing sail on the control cables 122 and 128, the tension is then also applied on the cable 132. The control cable 132 in turn extends through various pulleys to the cable 312 secured to the top 302 of the weight 300.

The movement of the sail 120, and similar movement of adjacent sails in a relatively high velocity wind, will cause tension to be applied through the inner top control cables and through the tension equalizer cable 312 to the top of the weight 300, thus drawing the weight upwardly. When the weight 300 moves up, within the column 12, tension is also applied to the lower control cables which extend from the weight to reels at the bottom or lower ends of the sail rollers.

The lower control cable 138 is shown in FIG. 4 as extending from the reel 136 of the sail roller 134. In FIG. 5, the lower control cable 138 is shown extending through an aperture 14 in the lower portion of the center column 12, over a fixed pulley, and upwardly to the bottom of the weight 300. Similarly, a lower control cable 158 is shown extending through an aperture 16, over a fixed pulley, and upwardly to the bottom of the weight 300. A lower control cable 178 is shown extending through an aperture 18, over a fixed pulley, and upwardly to the bottom of the weight 300. A fourth lower control cable 198 is shown extending through an aperture 20, over a fixed pulley, and upwardly to the bottom of the weight 300. There are four other lower control cables, including a lower control cable 218, a lower control cable 238, a lower control cable 258, and a lower control cable 278. The cables are also shown in FIG. 5 as extending to the center column 12, into the center of column 12, and upwardly to the bottom of the weight 300.

Referring again to FIG. 2, the control cable 138 is shown secured to the reel 136, the cable 158 is shown secured to the reel 156, the control cable 178 is shown secured to the reel 176, the control cable 198 is shown secured to the reel 196, and the control cable 218 is shown secured to the reel 216. The control cable 238 is shown secured to the reel 236, the control cable 258 is secured to the reel 256, and the control cable 278 is secured to the reel 276. The inner top control cables 132 . . . 272 are secured to the upper portion of the weight 300 by an equalizing tension cable 312, and the lower control cables 138 . . . 278 are secured directly to the bottom of the weight 300.

As the weight 300 moves up within the center of column 12, tension is applied to the lower control cables 138 . . . 278. The tension applied to the lower control cables 138 . . . 278 results in a movement of the various reels secured to the sail rollers. For example, by reference to FIG. 4, the movement of the sail roller 134 for the sail 120 may be visualized. As the weight 300 moves upwardly, tension is applied to the lower control cable 138. Movement of the weight 300, with the cable 138 secured to it, results in rotary movement of the reel 136. Rotary movement of the reel 136 is in turn imparted to the sail roller 134 secured thereto, which causes the sail to be furled or rolled on the sail roller 134. The furling of the sail 120 against the overall push or force of the wind, decreases the net effect or force of the wind on the sail by decreasing the surface area of the sail. The lessened force of the wind, combined with the furling of the sail, then results in a linear movement of the upper control cable 132 and of the control cables 122 and 128 secured thereto.

As the wind force or velocity decreases, the slack in the upper control cables increases, thus allowing the weight 300 to move downwardly in the column 12. As the weight moves downwardly, the tension is reduced on the lower control cables 138 . . . 278 and the furling procedure reverses, thus allowing the sails to be unfurled. The downward movement of the weight allows the cable 138 to wind on the reel 136 as the top inner control cable 132, and its respective cables 122 and 128, move linearly and the sail is thus unfurled. Movement of the weight 300 accordingly results in the furling and unfurling of the sails on and off the rollers.

The pair of flyball weights mentioned above, and as illustrated by the single flyball weight 358 in FIG. 6, provides a centrifugal flyball weight type governor to help in the furling and unfurling process. The cable 350, secured to the top of the weight 300, and the cable 370, also secured to the top of the weight 300, move in response to movement of their respective flyball weights. As the apparatus 10 rotates, the flyball weights move outwardly in response to centrifugal force. The outward movement of the flyball weight 358, on its cable 360, in turn applies a tension force on the cable 350 that is transmitted to the weight 300. The opposite flyball governor weight secured to the cable 370 applies a similar force. The combined forces of the flyball weights, responsive to the centrifugal force of the rotation of the apparatus 10, cause the weight 300 to move upwardly within the shaft or column 12. That is, when the speed of rotation of the apparatus 10 increases, centrifugal force moves the weights outwardly. The outward movement of the flyball weights pulls on the cables 350 and 370 to cause the weight 300 to rise. Conversely as the rotation of the apparatus 10 slows, the decreasing centrifugal force allows the flyball weights to release the tension force on the cables or lines 350 and 370. The weight 300 then moves downwardly as the centrifugal force decreases in response to a slower rotational speed of the apparatus 10. The movement of the flyball weights thus helps the movement of the weight 300 in terms of providing for the furling and unfurling of the sail elements in response to rotational speed of the wind turbine apparatus 10.

When it is desired to slow down or stop the wind turbine apparatus 10, regardless of its speed of rotation, the motor 344, with its attached winch and cable 340, is used. This is illustrated best in FIGS. 6, 7A, and 7B.

With the plate 342 in its full down position, as shown in FIGS. 6 and 7A, the plate 342 is disposed beneath the weight 300. Accordingly, the weight 300 moves in response to the movements of the various control cables and of the flyball governor weights, such as the flyball governor weight 358 shown in FIG. 6. However, when it is desired to cause the sails 120 . . . 260 (see FIG. 2) to furl or to wind on their rollers, the motor 344 is actuated to cause the cable 340 to be rolled up on the winch or drum associated with the motor 344. It will be understood that the diameter of the plate 342 is substantially larger than the diameter of the bore 304, but that the diameter of the cable 340 is substantially less than that of the bore 304, so that the weight 300 moves freely on the cable 340. However, when the motor 344 is actuated to raise the weight 300, the cable 340 moves upwardly, causing the plate 342 to move upwardly.

As shown in FIG. 7B, the plate 342 moves upwardly until it is disposed against the bottom surface 306 of the weight 300. Thereupon, the further upward movement of the cable 340 causes the weight 300 to move upwardly. As the weight 300 moves upwardly, the lower control cables 138 . . . 278 move upwardly with the weight. The movement of the cables 138 . . . 278 causes the reels 136 . . . 276, to which they are respectively secured, to rotate. The rotation of the respective rollers 134 . . . 274 rolls up or furls the sail elements 120 . . . 260, respectively.

It will be understood that, as the weight 300 moves upwardly, applying tension on the lower control cables 138 . . . 278, a corresponding slackening or linear movement of the available upper control cables 132 . . . 272 takes place. This allows the sail elements to furl completely. In the alternative, as when the sails 120 . . . 260 are furled in response to wind force, it is the tensioning of the upper control cables 132 . . . 272 which causes the weight 300 to move upwardly. When the weight 300 moves upwardly, there is a corresponding movement of the lower control cables 138 . . . 278. This movement causes the respective reels 136 . . . 276 to furl or roll up the sails. The furling of the sails is thus accomplished either in response to movement of the central cable 340 by the motor 344 or of the top control cables 132 . . . 272, as assisted by the flyball weight governor cables 350 and 370. Similarly, in the opposite manner, the sails unfurl in response to the downward or lowering movement of the weight 300 either by the lowering of the plate 342 on the cable 340 in response to a reverse movement of the motor 344, or by the lowering of the wind force which allows the sails 120 . . . 260 to return to their normal or neutral position, which is best illustrated in FIG. 2.

The actuation of the motor 344 to either raise or lower the weight 300 may be either by manual control or by automatic control. Automatic control may best be accomplished using wind velocity as the determining factor. For example, an anemometer (not shown) may be used to measure wind velocity. An output signal from the anemometer at a predetermined wind velocity may then cause the motor 344 to actuate to raise the cable 340 and the weight 300 to furl the sail elements. When the wind decreases to another predetermined velocity, the motor 344, which is a reversible motor, is actuated to lower the cable 340 and the weight 300 to unfurl the sails. The furling and unfurling may be either in increments, in response to wind velocity, or complete, as desired.

The size or mass of the weight 300 is determined in response to the general considerations desired for the apparatus 10, such as the size of the sail elements, the number of sail elements, etc. It is desired that the sails have a neutral position, as shown in FIG. 2, in which they are unfurled to their predetermined maximum. In such fully unfurled or unrolled configuration, the weight 300 is in a neutral position, with the tension on the upper control cables and on the lower control cables balanced to maintain the weight in its neutral position. The neutral position is a preferred bottom or lower position of the weight 300. Thus, upward movement of the weight 300 from the neutral or down position causes the sails to be furled, and the upward movement of the weight 300 depends upon the movement of the outer or free ends of the sails away from their neutral position or upon the movement of the flyball weights or upon the movement of the winch cable 340. As has been stated above, the neutral position of the sails is a position in which the plane of the sails, at the midpoint of each sail, is generally perpendicular to a radius of the apparatus from that location.

In the embodiments of FIGS. 1–7B, only a single tier of sails has been shown and discussed. However, it is obvious that a multiple tiered wind turbine apparatus may be utilized. That is, another row or more than one row of sail elements may be stacked in vertical relationship, with each sail connected to a center weight as generally described above. The multiple tiering or ganging of such sails requires the enlargement of the vertical height of the frame apparatus and also of the center shaft or column to accommodate the extra height of the sail elements and their controls.

The general size of the sails and the number of sails on any one tier may vary, depending on the amount of space available and on the ultimate output desired from such apparatus.

If desired, and for wind turbine apparatus of generally a large size, the utilization of a center column, such as the column 12, may be inconvenient. In such cases, a suspended ring system may be utilized, with the various upper and lower pulleys shown in FIG. 5 secured to the center column 12, suspended from an upper ring and a lower ring. The upper and lower rings, and any other rings required, may be appropriately secured by suspension cables from the frame 40 by well known and understood techniques.

The tapering configuration of the sails has been discussed, as has been the tapering configuration of the power rail 98 (see FIGS. 3 and 6). It may also be desired to have the reels, such as the reel 136 (see FIG. 4) tapered to compensate for the winding and unwinding of the cable over different radiuses so as to provide a general linear relationship between the movements of the top and bottom control cables.

In FIG. 3, there is a portion of the connecting frame shown secured to the outer frame 80. It will be understood that the configurations or designs required for various sizes of wind turbine apparatus may vary. The design is accordingly not set forth specifically herein.

Figure 9:
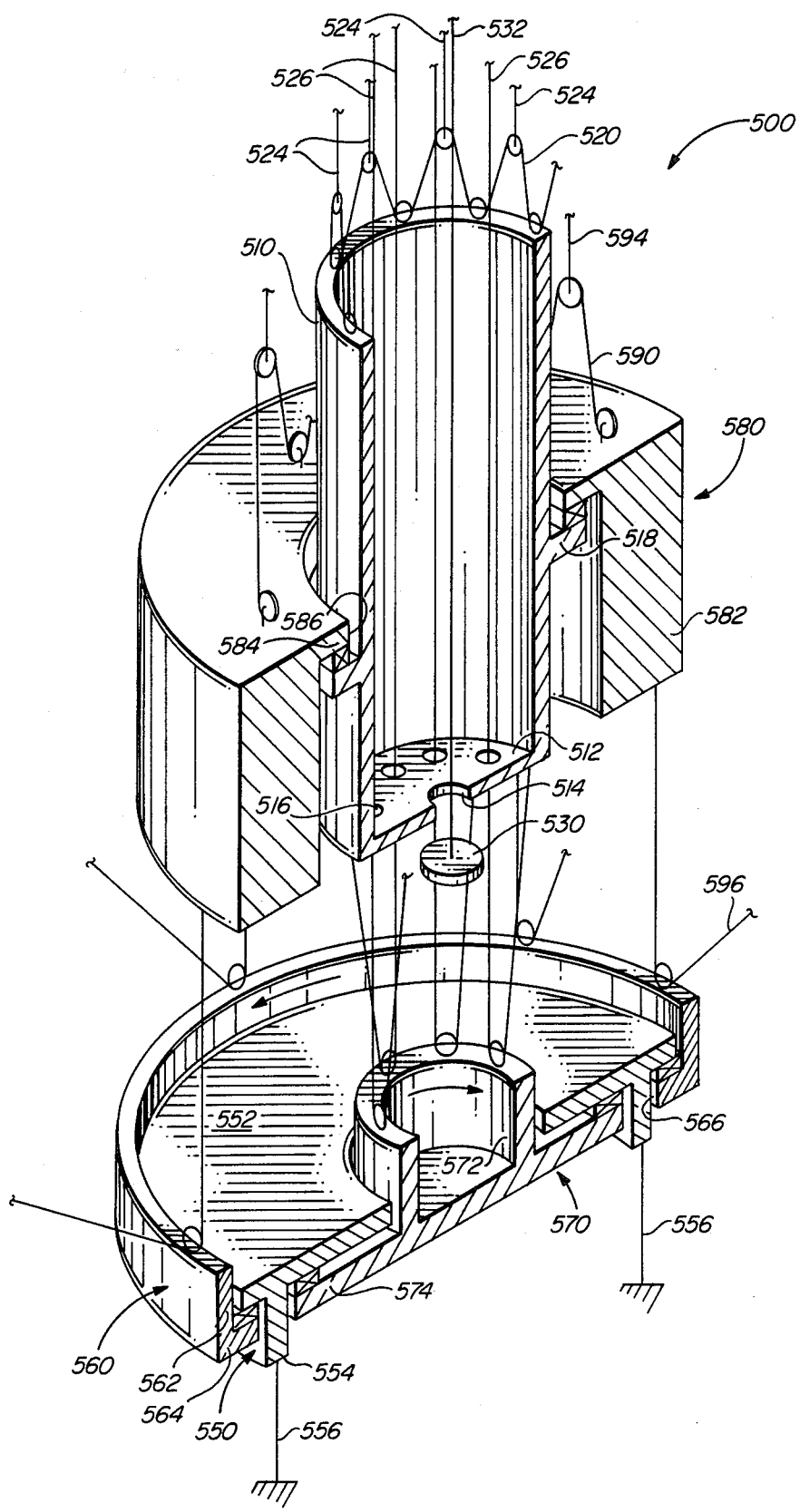
FIG. 9 is a view in partial section of a portion of the apparatus of FIG. 8.

FIG. 8 is a schematic representation of an alternate embodiment of the apparatus of FIGS. 1-7, comprising a counterrotating concentric wind turbine apparatus 400. FIG. 9 is a view in partial section of a portion of the wind turbine apparatus 400 of FIG. 8, comprising a view in partial section of the weight control system for the sail elements of the concentric turbine apparatus 400. For the following discussion, reference will primarily be made to FIGS. 8 and 9.

The counter-rotating concentric turbine apparatus 400 of FIGS. 8 and 9 includes an outer system 410 and an inner system 450. The outer system 410 and the inner system 450 rotate in opposite directions. Power is taken from planetary gears or power wheels disposed between the inner and outer systems. While gears will be discussed, power rails and wheels, as discussed above, may be used. The planetary gears include a planetary gear 440 having a power takeoff shaft 442 and a planetary gear 444 having a power takeoff shaft 446. The planetary gears 440 and 444 are rotated by frame elements secured to the inner periphery of the outer system 410 and the outer periphery of the inner system 450.

The outer system 410 is disposed on an appropriate support structure 402 and is journaled for rotation thereon. The inner system 450 is disposed on an appropriate support structure 404 and is journaled for rotation thereon.

The outer turbine system 410 of the counter-rotating concentric wind turbine apparatus 400 includes an outer frame 420 and an inner frame 430. The outer frame 420 and the inner frame 430 are appropriately spaced apart and, on additional structural elements extending between the outer and inner frames, are a pair of stacked sail systems. The sail systems include a top sail system 422 and a bottom or lower sail system 424. For convenience, the top sail system and the lower or bottom sail system are disposed one above the other and are appropriately secured to sail rollers which are supported on the structural framework which extends between the outer and inner frames.

The top and bottom sail systems are illustrative of a vertical orientation of a plurality of sails if such is desired. In the embodiment of FIGS. 1-7 only a single sail system is illustrated. However, it will be understood that the number of sails may be vertically increased, with more than one sail secured to vertically disposed sail rollers. For convenience, only a single sail roller 426 is shown in FIG. 8, and a sail of the upper sail system 422 and a sail of the lower sail system 424 are shown secured to the single sail roller 426. Normally, a sail roller will have only a single sail.

At either the top or the bottom of each sail roller, such as the sail roller 426, there may be a reel secured to the roller on which the sails are furled and from which the sails are unfurled Control cables extend from the reels to a control weight, all as discussed in general terms above in conjunction with the embodiment of FIGS. 1-7.

It will also be noted that, although a reel is illustrated in conjunction with the wind turbine apparatus 10 as being disposed at the bottom of each sail roller, it is obvious that such reel may be disposed at the top or upper part of a sail roller, if desired. However, for convenience in illustrating the apparatus 10, the reels have been placed at the bottom of each sail roller, thus simplifying the control system. The control cables for the reels extend rather directly to the bottom of a control weight, such as the weight 300, shown in FIGS. 1, 5, and 6, but other arrangements are also possible.

With a concentric system, such as the apparatus 400 of FIGS. 8 and 9, the placement of the control cables for the reels and the sail rollers for the outer system 410 will of necessity be above the inner system 450. Accordingly, the placement of the reels for the sail rollers may most conveniently be at the top of the sail rollers, but they may also be at the bottom of the sail rollers, if desired.

For purposes of clarity, reels and control cables for the sail elements and reels have been omitted from FIG. 8. Some of the cables are shown in FIG. 9, and the functioning of the cables is discussed in connection therewith.

Extending between the upper portions of the inner frame 430 of the outer system 410, and extending generally diametrically, are a plurality of support cables 412. The support cables 412 extend to a center ring 416. The ring 416 is disposed in the center of the apparatus 400 and is used to support the pulleys and other apparatus associated with the weight control system, which will be discussed below in conjunction with FIG. 9.

Secured to the bottom inner periphery of the inner frame 430 of the outer system 410 is a ring gear or power rail 432. The ring gear 432 meshes with the planetary gears or rails 440 and 444 for purposes of transferring power from the apparatus 400.

The inner system 450 is generally similar to the outer system 410. It includes an outer frame 460 and an inner frame 470. Appropriate support structure extends between the outer frame 460 and the inner frame 470 for purposes of providing support for the sail system of the inner system 450. The sail system may include a top sail system 462 and a lower or bottom sail system 464. A sail roller 466 is shown, with sails of the upper sail system 462 and the lower sail system 464 both secured to the sail roller 466. That is, as with the outer system 410, a pair of vertically oriented sails is secured to each sail roller.

Disposed at the outer periphery of the outer frame 460 of the inner system 450 is a ring gear 468. The ring gear 468 also meshes with the planetary gears 440 and 444. The power takeoff shafts 442 and 446 of the planetary gears 440 and 444, respectively, may be appropriately connected to other apparatus, as desired, for the utilization of the power derived from the apparatus 400. In FIG. 8, only two planetary gears are illustrated. However, it will be understood that as many planetary gears will be utilized as desired or needed for the utilization of power from the apparatus.

Extending diametrically across the inner system 450, in a manner similar to that of the outer system 410, are support cables 452. The support cables 452 extend to a ring 456 which is larger in diameter than, and is generally aligned with, the ring 416. The ring 456, like the ring 416, is used for supporting the cables necessary for the control of the sail elements for the inner system 450.

In the center of the inner system 450 is a control system 500 which comprises the weight and related elements for controlling the furling and unfurling of the sail elements for both the outer system 410 and the inner system 450. The control system 500 is best shown in FIG. 9, but the primary elements of the control system 500 are also shown in FIG. 8. The control system 500 includes a center shaft 510 and a weight 580 which is disposed about the center shaft 510. The shaft 510 and weight 580 are movable, in a manner similar to the movable weight 300 discussed above in conjunction with the embodiment of the turbine apparatus 10. The shaft 510 and the outer weight 580 rotate, along with the rotation of the outer and inner systems to which they are respectively secured. Thus, the outer system 410 is directly associated with the center shaft weight 510, and the inner system 450 is directly associated with the weight 580.

The center shaft 510 is of a generally cylindrical configuration, closed by a bottom plate 512. Extending through the bottom plate 512 are a plurality of apertures, including a center aperture 514 and a plurality of apertures 516 disposed radially outwardly from the center aperture 514 and arranged in a predetermined pattern. Control cables extend through the apertures 516, while a winch cable 532 extends through the center aperture 514.

Extending radially outwardly from the center shaft 510 is a collar 518. The collar 518 is appropriately secured to the center shaft 510. On the top of the center shaft 510 is an evener cable 520. The evener cable 520 extends over pulleys which are disposed on the upper surface or rim of the center shaft 510, in a manner similar to the general arrangement of the evener cable 312, shown best in FIG. 5.

A plurality of sail control cables 524 are secured to pulleys movable on the evener cable 520. The functioning of the sail control cables 524 and the evener cable 520 is generally as described above in conjunction with the turbine apparatus 10 of FIGS. 1–7.

A plurality of reel control cables 526 extend downwardly through the center shaft 510 and through the apertures 516. The reel control cables 526 extend through the apertures 516 and downwardly to the top of a rotating control plate assembly which includes a fixed control plate 550, an outer rotating control plate 560, and an inner rotating control plate 570.

The fixed control palte 550 is generally of a circular configuration having a "tee" shaped cross section. The plate 550 includes a horizontally extending flange 552 and a downwardly extending cylindrical portion 554. The fixed control plate 550 is secured to the ground by a plurality of tie-down cables 556. If desired, the cylindrical portion 554 may be a column extending downwardly and secured to the ground.

Disposed about the fixed control plate 550 is an outer rotating control plate 560. The outer rotating control plate 560 includes a vertically extending cylindrical flange 562 and a radially inwardly extending bottom flange 564. The flange 564 is generally horizontal. The bottom flange 564 terminates in a relatively large hole or aperture 566. The cylindrical portion 554 of the fixed control plate 550 extends through the aperture 566. The inner rotating control plate 570 is disposed coaxially with the fixed control plate 550 within the aperture 566 of the bottom flange 564.

Extending upwardly, generally in the center of the inner control plate 570, is a cylindrical flange 572. Extending outwardly beyond the cylindrical flange portion 572 of the inner control plate 570 is an outer flange portion 574. The outer flange 574 is generally aligned with the bottom flange 564 of the outer rotating control plate 560. The cylindrical portion 554 of the fixed control plate 550 is disposed between the bottom flange 564 of the outer rotating control plate 560 and the flange 574 of the inner rotating control plate 570. The horizontally extending flange portion 552 of the fixed control plate 550 is disposed over the aligned flanges 564 and 574. Appropriate bearing elements are used between various relative rotating elements of the outer rotating control plate 560, and the inner rotating control plate 570, and the fixed control plate 550.

The reel control cables 526 extend through the apertures 516 downwardly to the upper surface of the cylindrical flange 572 of the inner rotating control plate 570. The inner rotating control plate 570 accordingly rotates with the center shaft 510. The reel control cables 526 extend through pulleys secured to the top of the cylindrical flange 572 and then they extend upwardly to the bottom plate 512 of the center shaft 510 and are appropriately secured thereto. The purpose of the pulley arrangement and the inner rotating control plate 570 is to provide for the reversal of the reel control cables 526 to allow them to be secured to the bottom of the center shaft 510.

The weight 580 includes an outer cylindrical portion 582 which is disposed about the shaft 510. Extending inwardly from the upper portion of the cylinder 582 is a flange 584. The flange 584 is disposed above and generally in alignment with the collar 518 of the shaft 510. Appropriate bearing elements are disposed between the collar 518 and the flange 584 to allow for the relative rotation of the shaft 510 and weight 580.

Extending through the center of the flange 584 is an aperture 586. The shaft 510 extends through the aperture 586. As indicated above, the center shaft 510 rotates with the outer system 410 and the weight 580 rotates with the inner system 450.

For raising the center shaft 510 and the weight 580 there is a plate 530. The plate 530 is secured by a winch cable 532 to a motorized winch 534. The motorized winch 534 is in turn supported on the upper ring 416, as shown in FIG. 8, and rotates therewith and with the outer system 410.

The diameter of the plate 530 is greater than the diameter of the aperture 514 in the plate 512. When the motor of the winch 534 is actuated to wind the winch cable 532, the plate 530 makes contact with the bottom of the plate 512 and raises the shaft 510 and the weight 580. Reversing of the winch 534 to lower the plate 530 allows the shaft 510 and weight 580 to be lowered. The raising of the shaft 510 and weight 580 causes the furling of the sails, and the lowering of the shaft and weight causes the unfurling of the sails, in substantially the same manner as discussed above in conjunction with the turbine apparatus 10 of FIGS. 1-7.

Secured to the top of the weight 580 is an evener cable 590. The evener cable 590 extends through pulleys appropriately secured to the top of the weight 580. A plurality of sail control cables 594 are secured to the evener cable 590 through a pulley arrangement substantially as discussed above in conjunction with the weight 300 and also the shaft 510. The sail control cables 594 in turn extend to the inner system sail elements.

A plurality of reel control cables 596 extend from the reels associated with the sail rollers of the inner system 450. The cables 596 extend over pulleys secured to the upwardly extending flange 562 of the outer rotating control plate 560. The reel control cables 596 then extend upwardly from the outer rotating control plate 560 to the bottom of the cylindrical portion 582 of the weight 580 to which they are appropriately secured.

The fixed control plate 550 comprises a fixed core secured to the ground, but suspended thereabove, and anchored to the ground by a plurality of cables 556. The outer rotating control plate 560 rotates about the fixed control plate 550 and is associated with the weight 580. The reel lines 596 for the inner stage or inner system 450 extend over pulleys secured to the outer rotating control plate 560. The reel lines 596 then terminate on the bottom of the outer cylinder 582 of the weight 580.

The weight 580 moves vertically in response to the various wind loads imposed on the sail elements. In the alternative, it moves in response to movement of the winch line 532 and the plate 530 as the plate 530 contacts the bottom 512 of the inner or center shaft 510 in response to actuation of the motor of the winch 534. The outer rotating control plate 560 remains fixed, vertically, but rotates with the inner system 450. The inner rotating control plate 570 also remains fixed vertically, but it rotates in response to rotation of the outer system 410.

The reel control lines or control cables 526 for the outer system 410 extend through pulleys secured to the top of the inner cylindrical flange 572 of the control plate 570. The control cables 526 extend downwardly through the apertures 516 in the bottom plate 512 of the cylinder or shaft 510 and through the pulleys secured to the top of the cylindrical flange 572. The cables 526 then extend upwardly and terminate or are secured to the bottom of the plate 512.

Since the inner system 450 rotates in a direction opposite to that of the outer system 410, it will be understood that the outer control plate 560 and the inner control plate 570 also rotate in opposite directions. As discussed above, appropriate bearings are used to permit the rotation of the control plates 560 and 570 relative to the fixed control plate 550.

As also indicated above, the shaft 510 and weight 580 rotate oppositely to each other. Appropriate bearings are also used to permit the relative rotation of the shaft 510 and weight 580. However, the opposite rotation is the only relative movement between the two elements since they both move together vertically in response to either the sail elements or the motor of the winch 534 as it moves the winch line 532 and the plate 530 to in turn move the center shaft 510 and the weight 580. The shaft 510 and weight 580 move vertically together, but they rotate independently in the horizontal plate.

It will be noted that a flyball governor system is not shown in conjunction with the system 400 of FIGS. 8 and 9. However, if such is desired to assist in raising the weight 580 and center shaft 510, it would be mounted on the exterior of the outer system 410. The cables associated with a flyball governor system would be secured to the inner shaft or pipe 510.

Figures 10A, 10B, 10C:
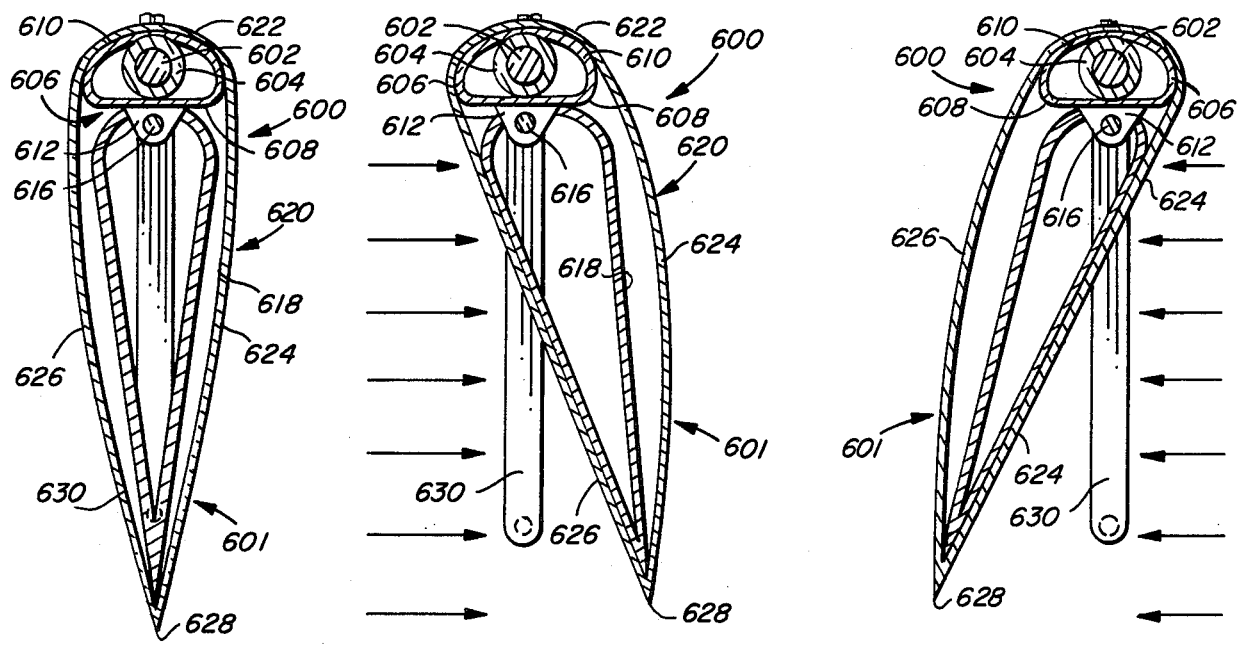
FIG. 10A is a view in partial section of an alternate embodiment of a portion of the apparatus of the present invention.
FIGS. 10B and 10C are sequential views illustrating the operation of the apparatus of FIG. 10A.

FIGS. 10A 10B, and 10C are sequential views illustrating an air foil sail element or apparatus 600, which comprises an alternate sail embodiment from that discussed in conjunction with the embodiments of FIGS. 1-9. FIG. 10A shows the air foil sail element 600 in a static, symmetrical configuration. FIG. 10B illustrates the air foil element 600 disposed from its static location by a wind force from the left, as shown. FIG. 10C shows the air foil element 600 displaced from its center, static symmetrical position, by a wind force from the right.

Figure 11:
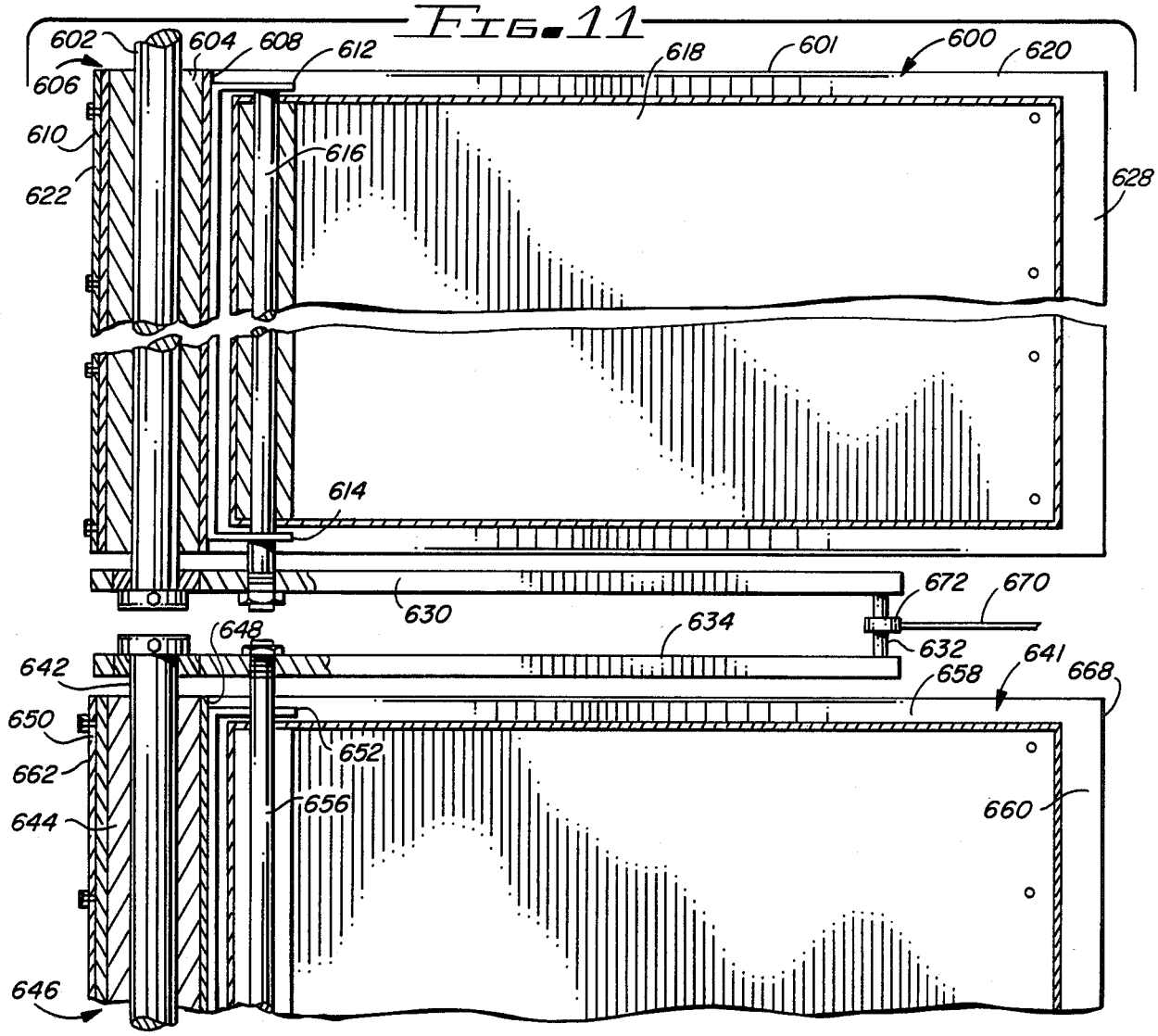
FIG. 11 is a side view in partial section of the apparatus of FIG. 10A.

FIG. 11 is a view in partial section showing a portion of the air foil sail apparatus 600 in partial section. FIG. 11 is taken generally from the side, and thus comprises a general elevational view in partial section.

FIG. 12 is a perspective view of a portion of the air foil sail apparatus 600, with a part broken away. For the following discussion, reference will generally be made to FIGS. 10A, 10B, 10C, 11 and 12.

The air foil sail apparatus 600 may be used in place of the sail elements discussed above in conjunction with FIGS. 1-9. The air foil apparatus 600 includes two sail elements which are vertically aligned and which do not furl and unfurl on a sail roller. Rather, the air foil sail elements move or rotate on support rods, which take the place of the said rollers, and they include separate pivot rods on which the air foil sail elements may move. The movement causes a flexing of the air foil sail elements to change the camber of the air foil and accordingly the aerodynamic lift derived from the air foils. The air foil sail apparatus 600 includes two portions, an upper air foil sail element 601 and a lower air foil sail element 641. The two air foil elements are connected together by a pair of links 630 and 634 for the upper and lower elements 601 and 641, respectively. The links 630 and 634 are tied together by a single connecting pin 632.

The upper air foil 601 is disposed on an upper support rod 602, while the lower air foil 641 is disposed on a lower support rod 642. The rods 602 and 642 are aligned with each other, but are spaced apart to allow a control cable 670 to pass through, thereby permitting the links 630 and 634, their connecting pin 632 and the air foils, to rotate freely for a complete 360° revolution if necessary. The upper air foil 601 is appropriately journaled for rotation on the support rod 602, and the lower air foil 641 is appropriately journaled for rotation on the lower support rod 642.

The upper air foil 601 is journaled for rotation on the support rod 602 by a bearing 604. The lower air foil 641 is journaled for rotation on the rod 642 by a bearing 644.

The framework necessary to support the upper and lower air foils is not shown. However, it will be understood that framework similar to that discussed above in conjunction with the embodiment of FIGS. 1–7 and the embodiment of FIGS. 8 and 9 will be used to support the air foil sail elements. Since the air foil sail elements do not include sail rollers, lower control cables, discussed above in conjunction with the embodiments of FIGS. 1–9 will not be required. However, instead of the control cables associated with the furling and unfurling of the sail elements discussed in FIGS. 1–9, the air foil sail elements of FIGS. 10A–12 include a single control cable, which will be discussed below.

Appropriately secured to the bearing 604 is a form 606. The form 606, as best shown in FIGS. 10A, 10B, and 10C, is generally in the form of a "D" which includes a flat base 608 and a curved nose 610. The form 606 is used to help define the aerodynamic curvature of the upper air foil 601. The bearing 604 is disposed in the center of the form 606.

Extending rearwardly from the flat base 608, and thus away from the curved nose 610, are a pair of tabs. The tabs include a top tab 612 and a bottom tab 614. The tabs extend outwardly from the flat base 608, and thus away from the bearing 604 and from the support rod 602. The tabs 612 and 614 include a pair of aligned apertures through which extends a pivot rod 616.

While the air foils of the apparatus 600 pivot or rotate on the support rods 602 and 642, respectively, the deformation of the air foils, with respect to their aerodynamic characteristics due to the change of the camber of the air foils, is brought about by the pivoting of the air foils relative to their respective pivot rods. The pivot rod 616 is utilized for the upper air foil 601.

Secured to the pivot rod 616 is an interior form 618. The interior form 618 comprises a rigid shell, or form, pivotally secured to the upper pivot rod 616 and extending rearwardly therefrom, or away from the upper support rod 602 and the form 606, and to a trailing edge of the air foil sail element 601.

Disposed about the form 606 and the interior form 618 is an outer skin 620. The outer skin 620 is of springy or deformable material and is generally in the form of an aerodynamically configured air foil. It includes a leading edge 622, which is disposed about the curved nose 610 of the form 606, and a pair of sides 624 and 626 which extend rearwardly from the leading edge 622. The outer skin 620 terminates in a trailing edge 628. The trailing edge 628 is also secured to the trailing edge of the interior form 618. The interior form 618 helps to provide structural integrity for the skin 620 as it moves and deforms. This is best shown in FIGS. 10B and 10C.

The pivot rod 616 extends downwardly from the upper tab 612, through the lower tab 614, and is appropriately secured to the link 630. At the same time, the upper support rod 602 extends downwardly from the apparatus frame, not shown, also to the link 630. The link 630 is appropriately journaled for rotation about the upper support rod 602 and is appropriately secured thereto. As best shown in FIGS. 11 and 12, the link 630 defines the bottom portion of the upper air foil 601, and the support rod 602 accordingly extends upwardly from the link 630 to the frame member (not shown) to which it is secured.

The lower air foil 641 is substantially identical to the upper air foil 601. It includes a lower support rod 642 which is appropriately secured to the link 634. From the link 634, which is appropriately journaled for rotation about the lower support rod 642, the lower support rod 642 extends downwardly to an appropriate frame member (not shown) to which it is secured. As indicated previously, the support rods 602 and 642 are vertically aligned.

Appropriately secured to the bearing 644 is a lower form 646, which is substantially identical to the upper form 606. The form 646 includes a flat base 648 and a curved nose 650. The form 646 also includes a pair of tabs, including a top tab 652, through which extends a lower pivot rod 656.

An interior form 658 is also secured, for pivotal action, on the pivot rod 656. An outer skin 660 is in turn secured to the form 646 and to the interior form 658. The outer skin 660 includes a leading edge 662 and a pair of sides which extend from the leading edge 662 to a trailing edge 668.

Referring to FIG. 10B, a wind from the left, against the side 626 of the skin 620 of the upper air foil 601, causes a deflection of the air foil sail apparatus 600 from the neutral position shown in FIG. 10A. As the air foil apparatus 600 moves, it pivots on two axes. The first pivot axis is on the axis of the pivot rods 616 and 656 and the second is about the axis of rotation on the support rods 602 and 642. A change in the camber of the skins results, with a flattening of the side 626 and an increase in the convex curvature of the side 624 illustrated. The increase in the camber of the side 624 causes an increase and lift of that side, which tends to help move the air foil sail element 600 with the wind in a direction generally perpendicular to the wind by providing a low pressure area generally in the direction of the movement of the apparatus. Thus, in addition to the direct force of the wind against the air foil sail elements 601 and 641 there is also an aerodynamic lift provided by the apparatus 600.

When the wind blows from the opposite direction, as shown in FIG. 10C, the opposite result occurs. That is, there is a flattening of the skin side 624 and an increase in the convex configuration of the skin side 626. The increase in the camber of the side 626 increases the aerodynamic lift by causing a low pressure area on the side 626 which helps to move the air foil sail element system or apparatus 600 perpendicular to the wind.

For controlling the sail element 600, the links 630 and 634 and the connecting pin 632 are used. A control cable 670 is shown in FIG. 11 connected to the pin 632 by an appropriate bearing element 672. Wind force against the aerodynamic sail elements of the air foil apparatus 600 will cause movement of the two air foil elements 601 and 641 in a direction generally perpendicular to the relative wind, except that the air foil elements will pivot with the wind instead of moving generally in a straight line. The movement of the air foil elements will also cause movement of the links 630 and 634 and will thus result in movement of the control cable 670. The control cable 670 corresponds to the upper control cables of the embodiments of FIGS. 1–9 to allow the air foil elements to move with the wind a greater or lesser amount. For example, if the wind causes the air foil elements to move, movement of the links allows the entire air foil to pivot on the support rods. This decreases the angle of attack of the air foil to decrease the aerodynamic lift effect. It also presents less surface area of the air foil to the relative wind, and the air foil sail elements move sideways to spill the excess wind over or agains them. As the relative wind decreases, the lessened force of the win on the air foils permits linear movement of the cable 670 to allow the air foils to pivot to increase the cross sectional area of the wind cut by the air foils. The cable 670 extends to an evener cable (not shown) on a weight (also not shown). The tension of the cable 670 moves the weight vertically in a manner similar to the upper control cables discussed above in conjunction with the embodiments of FIGS. 1-9.

Thus, referring again to the embodiments of FIGS. 1-9, sail elements, such as the said element 600, may be substituted for the roller sail elements. As indicated above, the same framework is used, and the only elements not needed with the air foil sail elements are the lower control cables secured to the bottom of the weight. The upper control cables, secured to the top of the weight through an evener cable, are still used.

FIG. 13 is a perspective view of another alternate embodiment of the apparatus of the sail element apparatus comprising a part of the present invention. The alternate embodiment comprises an air foil sail element 700. The air foil element 700 is shown in FIG. 13 partially broken away.

FIG. 14A is a top view of the air foil sail element 700 of FIG. 13. FIG. 14B and FIG. 14C are sequential views of the sail element 700 of FIGS. 13 and 14A. FIG. 14B shows the air foil sail element 700 displaced from the neutral position shown in FIG. 14A by a wind coming from the left. FIG. 14C shows the air foil sail element 700 displaced from the neutral position of FIG. 14A by a wind from the right. For the following discussion of the air foil sail element 700, reference will primarily be made to FIGS. 13, 14A, 14B, and 14C.

The air foil sail element 700 shown in FIG. 13 comprises an upper air foil of a pair of air foils, similar to the air foil system 600 of FIGS. 10A-12, and best shown in FIG. 11. Of the assembly, only the upper air foil is illustrated in the Figures.

The air foil 700 includes a support rod 704 about which the air foil 700 pivots. The support rod is appropriately secured to the framework (not shown) of a wind turbine apparatus from the top. The rod 704 terminates at the bottom of the air foil 700. The rod 704 may be appropriately journaled for rotation in the framework, or in the alternative, the rod 704 may be fixed in place with the air foil 700 journaled for rotation about the rod 704. If the rod 704 is journaled for rotation, then an interior form 706 may be secured thereto. If the rod 704 is fixed in place, the interior form 706 may be appropriately journaled for rotation on the rod 704. The interior form 706 extends from the rod 704 rearwardly and terminates at a trailing edge 728. The form 706 extends slightly forwardly of the rod 704 to define the leading edge of the air foil sail element 700.

Disposed remotely from the rod 704, and closer to the trailing edge 728 than the rod 704, is a pivot rod 710. The pivot rod 710 defines a pivot axis rearwardly from the rod 704 on which the air foil sail element 700 pivots in response to a wind. The air foil sail element 700 has one pivot axis, the rod 704.

Disposed about the interior form 706 is an outer skin 720. The outer skin 720 includes a nose portion 722 which extends forwardly of the pivot rod 704 and forwardly of the front or nose portion of the interior form 706. The skin 720 also includes a pair of sides 724 and 726 which extend rearwardly from the nose 722 and terminate at the trailing edge 728. The skin 720 is secured to the interior form 706 only at the trailing edge 728.

Secured to the pivot rod 710 is a control cable 750. The cable 750 is secured to the pivot rod 710 by a connector and bearing assembly 752. The connector and bearing assembly 752 pivots freely on the rod 710 in response to movement of the air foil sail element 700 as the air foil sail element 700 moves with the wind.

In FIG. 14A, the air foil 700 is shown in its neutral position. In FIG. 14B, the air foil 700 is shown pivoted on the rod 704 in response to a wind coming from the left. The side 726 of the skin 720 is disposed against the left side of the interior form 706, and the right side 724 extends outwardly, thus increasing the camber of the right side of the air foil element 700. Air flowing over the increased camber portion 724 of the skin 700 provides a low pressure lift area which helps move the air foil 700, and the wind turbine apparatus (not shown) to which it is secured, by aerodynamic forces as well as by the direct force of the wind against the air foil sail element 700.

In FIG. 14C, the wind is from the right, or from the opposite direction from that shown in FIG. 14B. The side 724 of the skin 720 is shown disposed against the interior form 706, while the side 726 of the skin extends outwardly, with an increased camber, to thus provide a low pressure lift area on the opposite side of the air foil 700 from that shown in FIG. 14B.

The cable 750 extends to an evener cable secured to the top of a weight, substantially the same as discussed above in conjunction with FIGS. 10A-12 and similar to the upper control cables which extend from sail elements to weights as discussed in conjunction with the embodiments of FIGS. 1-11. The movement of the air foil sail element 700 and its control cable 750, etc., is substantially as discussed above in conjunction with the apparatus 600 of FIGS. 10A-12.

In the embodiments of FIGS. 10A-14C, the outer skin of both embodiments of the air foil sail elements is deformable. Interior forms are used, and the outer skins are spaced apart from the interior forms when the air foil elements are in their neutral or static positions. With wind forces acting on the air foil sail elements, the outer skins deform to a maximum deflection against the interior forms on one side and away from the forms on the other side. This maximum deflection is shown in FIGS. 10B, 10C, 14B, and 14C. Obviously, the skins are made of spring material.

If desired, the air foil sail elements may have a fixed cross section and thus may not deform under wind loads. Such sail elements may preferably have a cross-sectional configuration similar to the cross-sectional configurations shown in FIGS. 10A and 14A, which comprise the neutral or symmetrical renderings of the air foil sail element apparatus 600 and 700, respectively. When using an air foil sail element with a fixed cross-section, the camber on both sides of the chord does not vary and no deflection of the outer skin occurs. Mechanically, this would appear to be a simpler system than those shown in FIGS. 10A-14C.

In the above discussed embodiments, cables have been illustratively connected to the weights for moving the weights and the various sail elements in response to wind forces. It will be understood that electric motors could be used in place of the direct cable connections, thus providing only electrical connections for moving the weights and the various sail elements. Electric motors thus could be used to control the movement of the weights and to control the movements of the sail elements. Appropriate electrical control elements, such as potentiometers, could be used to sense the wind force as applied to the sail elements and accordingly to provide an output signal in response to the movement of the sail elements. The various electric motors would be used to raise and lower the weights and to furl and unfurl the sail elements or appropriately pivot the air foil sail elements, all in response to predetermined parameters. Hydraulic motors could be used instead of electric motors, if desired. Moreover, electronic control systems, connected to a wind speed or velocity sensing element, such as an anemometer, could also be used. For example, predetermined wind parameters could be programmed into a read only memory (ROM) of a microprocessor. At various wind speeds, microprocessor controlled motors would be actuated to furl or unfurl sail elements, etc.

With the air foil sail elements, as wind speed increases, increased slack is put into the lines to allow the air foils to move in the wind. Ultimately, with a predetermined wind speed, the air foil sail elements turn or rotate freely with the wind. This allows them to virtually "feather" or streamline with the wind. Raising a weight puts the slack into the cables, as discussed above.

In the embodiment of FIGS. 1–9, reels have been illustratively discussed in conjunction with the sail rollers. For certain applications, it may be desirable to utilize spring elements in place of the weight, with the cable connections and reels associate therewith remaining. For example, tension springs may be used to cause the sail rollers to move. Such tension springs may apply a predetermined load on the sail rollers, for example, at a neutral position. An increase in the wind forces may result in an increased pull on the control cables, thereby rotating the reels and rollers, and furling the sails. On the other hand, a decrease in the wind forces may impose a decreased pull on the tension cables which may result in the unfurling of the sails.

There are inherent problems with springs, such as cost, metal fatigue, and variable spring tension. The latter problem is significant in that spring tension increases as distance increases. With a weight system, as shown in the drawing figures, the tension is relatively constant.

Due to the difference in the diameters of the sail rollers and the reels, movement of a sail pulling against a control cable will cause slack in the control cable lines because more cable, linearly, will be unwound from a reel than sail, linearly, will wind on a sail roller as the roller and reel rotate.

In addition to the control systems for the sail elements, a control system for the generators (alternators) connected to the various power takeoff shafts is utilized. As stated above, there are a plurality of power take-off shafts spaced apart from each other, and each shaft is secured to a generator or alternator or other appropriate device.

At a predetermined rotational speed, one or more devices or units will cut in, and then additional devices will cut in at other predetermined speeds. When a maximum rotational speed is achieved, all of the devices will be "on line" for maximum power output.

As the wind force decreases, and rotational speed also decreases, the devices will be cut out in the reverse manner as they were cut in. That is, at a predetermined rotational speed, one or more devices will be cut out. As the rotational speed further decreases, additional devices or units will be cut out.

It will be noted that the amount of power conversion will vary, depending on the velocity of the wind. The power conversion will be low in a relatively low wind, and will increase to a maximum in a wind of a predetermined maximum velocity. Above the predetermined maximum velocity, the sails will be furled or rolled up or the air foils will be allowed to turn free by the raising of the control weight by the winch, as discussed above.

The number of power conversion units or devices depends on the size of the wind turbine apparatus and on the size of the individual devices. The placement or spacing of the individual units or devices is preferably based on symmetry so far as practical.

Brakes on the power wheels to lock the apparatus in place have not been shown in the drawing FIGS. Obviously, brake elements will be needed.

In the discussion associated with FIGS. 10A through 14C, dual or paired air foil sail elements are shown. If desired, single air foil sail elements may be used or more than two elements may be vertically connected together. The number of elements connected together in any particular embodiment depends on the size, desired output, control system, and other considerations.

What is claimed is:

1. Wind turbine apparatus, comprising, in combination:
    frame means rotatable in response to wind;
    sail means, including a plurality of sails secured to the frame means for receiving the wind and adapted to impart rotary motion to the frame means;
    roller means for furling and unfurling the sails;
    control means for controlling the furling and unfurling of the sails, including
        weight means movable upwardly and downwardly,
        upper control cable means secured to the weight means and to the sails and adapted to move the weight means upwardly in response to movement of the sails away from a predetermined neutral position in response to the wind, and
        lower control cable means secured to the weight means and to the roller means and adapted to furl the sails by movement of the roller means in response to the upward movement of the weight means.

2. The apparatus of claim 1 in which the roller means includes a roller secured to the frame means for each sail of the plurality of sails.

3. The apparatus of claim 2 in which the roller means further includes a reel secured to each roller and to the lower control cable means for rotating the rollers for furling the sails.

4. The apparatus of claim 3 in which each sail includes a fixed end secured to a roller, and a free end remote from the roller movable in response to the force of the wind.

5. The apparatus of claim 1 in which the upper control cable means includes a cable secured to and movable with the free end of each sail and adapted to move the weight means upwardly in response to movement of the free end of a sail away from a neutral position.

6. The apparatus of claim 5 in which the lower control cable means includes a plurality of cables, and each cable is secured to and wound about a corresponding reel of the roller means for rotating the roller means to furl the sails in response to movement of the weight means.

7. The apparatus of claim 1 in which the control means further includes flyball governor means responsive to the rotation of the frame means for moving the weight means upwardly and downwardly.

8. The apparatus of claim 7 in which the weight means includes a weight and a bore extending centrally through the weight, and the weight includes an upper surface and a lower surface.

9. The apparatus of claim 8 in which the flyball governor means is secured to the upper surface of the weight.

10. The apparatus of claim 8 in which the control means further includes a cable movable in the bore of the weight and a plate secured to the cable and adapted to engage the lower surface of the weight for moving the weight upwardly in response to an upward movement of the cable.

11. The apparatus of claim 8 in which the upper control cable means is secured to the upper surface of the weight.

12. The apparatus of claim 11 in which the upper control cable means includes an evener cable for evening the tension of the cables of the upper control cable means.

13. The apparatus of claim 11 in which the lower control cable means is secured to the lower surface of the weight.

14. Wind turbine apparatus, comprising in combination:

frame means;

sail means secured to the frame means and adapted to rotate the frame means in response to wind, including a plurality of sail elements;

control means for controlling the sail means in response to wind velocity, including
weight means,
connecting means for connecting the weight means and the sail elements of the sail means for moving the weight means in response to wind velocity, and
evener cable means connected to the weight means and to the connecting means for interconnecting the weight means and the connecting means to even out the movement of the weight means in response to movement of any one or more of the sail elements by localized gusts of wind; and means for taking off power from the frame means as it rotates in response to wind.

15. The apparatus of claim 14 in which the frame means includes an outer frame rotating in a first direction and an inner frame rotating in a second direction.

16. The apparatus of claim 14 in which the sail means further includes a plurality of sail rollers, and the sail elements comprise a plurality of sails disposed on the sail rollers and the sails furl and unfurl on and from the sail rollers in response to wind velocity.

17. The apparatus of claim 16 in which the connecting means includes means for connecting the sail rollers to the weight and means for connecting the sails to the evener cable means.

18. The apparatus of claim 14 in which the sail elements of the sail means comprise a plurality of air foil sail elements.

19. The apparatus of claim 18 in which each air foil sail element includes an upper air foil and a lower air foil.

20. The apparatus of claim 19 in which the upper and lower air foils are connected to the weight means by a cable disposed between them.

21. The apparatus of claim 1 in which the control means includes winch means connected to the weight means for raising the weight means to furl the sail means.

22. The apparatus of claim 14 in which the control means includes winch means for raising the weight means.

23. The apparatus of claim 15 in which the means for taking off power from the frame means includes first power means for transmitting power from the outer frame, second power means for transmitting power from the inner frame, and means cooperating with the first power means and the second power means for transmitting power from the outer and inner frames.

24. The apparatus of claim 23 in which the first power means comprises a first power rail connected to the outer frame, and the second power means comprises a second power rail connected to the inner frame.

25. The apparatus of claim 24 in which the first power rail is connected to the inner periphery of the outer frame, and the second power rail is connected to the outer periphery of the inner frame, and the means cooperating with the first and second power means is disposed between the first and second power rails.

26. The apparatus of claim 15 in which the weight means of the control means includes:

a first weight secured to the outer frame and rotatable therewith for rotation in the first direction, and a second weight disposed about the first weight and secured to the inner frame and rotatable therewith for rotation in the second direction.

27. The apparatus of claim 26 in which the evener cable means of the control means includes a first evener cable secured to the first weight and to the sail means of the outer frame, and a second evener cable secured to the second weight and to the sail means of the inner frame.

28. The apparatus of claim 26 in which the control means further includes a fixed plate, a first plate rotatable on the fixed plate and connected to and rotatable with the first weight, and a second plate rotatable on the fixed plate and connected to and rotatable with the second weight.

29. The apparatus of claim 26 in which the control means further includes winch means for raising the first and second weights independent of the sail means.

* * * * *